US008710693B2

(12) United States Patent
Amano et al.

(10) Patent No.: US 8,710,693 B2
(45) Date of Patent: Apr. 29, 2014

(54) POWER GENERATING APPARATUS OF RENEWABLE ENERGY TYPE AND METHOD OF ATTACHING AND DETACHING BLADE

(75) Inventors: Yoshiyuki Amano, Tokyo (JP); Kazuhisa Tsutsumi, Tokyo (JP); Taku Ichiryuu, Akashi (JP); Takuro Kameda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/358,013

(22) Filed: Jan. 25, 2012

(65) Prior Publication Data

US 2013/0076042 A1     Mar. 28, 2013

Related U.S. Application Data

(63) Continuation of application No. PCT/JP2011/071676, filed on Sep. 22, 2011.

(51) Int. Cl.
*F03D 9/00*        (2006.01)

(52) U.S. Cl.
USPC ............................................... 290/55

(58) Field of Classification Search
USPC ................................... 290/44, 55
See application file for complete search history.

(56) References Cited

U.S. PATENT DOCUMENTS

| 4,198,572 | A | * | 4/1980 | Kant | 290/44 |
| 4,280,061 | A | | 7/1981 | Lawson-Tancred | |
| 4,533,297 | A | * | 8/1985 | Bassett | 416/132 B |
| 4,757,211 | A | * | 7/1988 | Kristensen | 290/55 |
| 6,759,758 | B2 | | 7/2004 | Torres Martinez | |
| 6,911,741 | B2 | | 6/2005 | Pettersen et al. | |
| 7,207,777 | B2 | | 4/2007 | Bervang | |
| 7,397,145 | B2 | | 7/2008 | Struve et al. | |
| 7,569,943 | B2 | | 8/2009 | Kovach et al. | |

(Continued)

FOREIGN PATENT DOCUMENTS

| CN | 201747854 U | 2/2011 |
| CN | 201982255 U | 9/2011 |

(Continued)

OTHER PUBLICATIONS

International Search Report and Written Opinion for PCT/JP2011/071676 dated Nov. 8, 2011.

(Continued)

*Primary Examiner* — Tulsidas C Patel
*Assistant Examiner* — Viet Nguyen
(74) *Attorney, Agent, or Firm* — Kanesaka Berner & Partners

(57) ABSTRACT

It is intended to provide a power generating apparatus of renewable energy type in which a braking mechanism is attached to a rotor arranged upstream of a hydraulic transmission while saving space, and a method of attaching and detaching a blade for the apparatus. The power generating apparatus of renewable energy type is provided with: a rotor having a hub and a main shaft, the hub having at least one blade mounted thereon, the main shaft being coupled to the hub; a generator which generates power by torque inputted from the rotor; and a hydraulic transmission which transmits the torque from the rotor to the generator. A brake disc is fixed to the rotor by tightening together with the hub and the main shaft. A brake caliper is provided to force a brake pad against the brake disc to apply a braking force to the rotor.

20 Claims, 8 Drawing Sheets

(56) References Cited

U.S. PATENT DOCUMENTS

| | | | |
|---|---|---|---|
| 7,642,668 B2 | 1/2010 | Kim et al. | |
| 7,656,055 B2 * | 2/2010 | Torres et al. | 290/55 |
| 7,815,536 B2 * | 10/2010 | Jansen et al. | 475/159 |
| 7,863,767 B2 | 1/2011 | Chapple et al. | |
| 7,884,493 B2 * | 2/2011 | Buskirk et al. | 290/55 |
| 7,887,284 B2 * | 2/2011 | Merswolke et al. | 415/4.3 |
| 7,911,076 B2 * | 3/2011 | Stephens et al. | 290/55 |
| 7,936,080 B2 * | 5/2011 | Bech et al. | 290/55 |
| 7,944,079 B1 | 5/2011 | Signore et al. | |
| 7,956,484 B2 | 6/2011 | Stiesdal | |
| 8,028,604 B2 | 10/2011 | Moore et al. | |
| 8,197,215 B2 | 6/2012 | Andersen et al. | |
| 8,210,507 B2 | 7/2012 | Mitsch | |
| 8,210,810 B2 | 7/2012 | Egoshi et al. | |
| 8,405,238 B2 | 3/2013 | Dahlhaug | |
| 2003/0168862 A1 | 9/2003 | Ishizaki | |
| 2004/0041407 A1 | 3/2004 | Pettersen et al. | |
| 2005/0205365 A1 * | 9/2005 | Plantan et al. | 188/71.1 |
| 2006/0196288 A1 * | 9/2006 | Aust et al. | 74/411.5 |
| 2007/0187954 A1 | 8/2007 | Struve et al. | |
| 2008/0042445 A1 * | 2/2008 | Stephens | 290/55 |
| 2008/0084068 A1 * | 4/2008 | Shibata et al. | 290/44 |
| 2008/0216301 A1 | 9/2008 | Hansen et al. | |
| 2008/0272602 A1 | 11/2008 | Kim et al. | |
| 2008/0308980 A1 | 12/2008 | Mitsch | |
| 2009/0015020 A1 | 1/2009 | Stiesdal | |
| 2009/0025219 A1 | 1/2009 | Hansen et al. | |
| 2009/0140522 A1 * | 6/2009 | Chapple et al. | 290/43 |
| 2010/0018055 A1 | 1/2010 | Lynderup et al. | |
| 2010/0032959 A1 | 2/2010 | Nies | |
| 2010/0040470 A1 | 2/2010 | Nies et al. | |
| 2010/0133817 A1 | 6/2010 | Kinzie et al. | |
| 2010/0194114 A1 * | 8/2010 | Pechlivanoglou et al. | 290/55 |
| 2010/0320770 A1 | 12/2010 | Dahlhaug | |
| 2010/0329867 A1 * | 12/2010 | Patel et al. | 416/169 R |
| 2011/0123339 A1 * | 5/2011 | Eriksen et al. | 416/169 R |
| 2011/0133453 A1 * | 6/2011 | Merswolke et al. | 290/44 |
| 2011/0140425 A1 * | 6/2011 | Staedler | 290/44 |
| 2011/0142598 A1 | 6/2011 | Andersen et al. | |
| 2011/0143880 A1 | 6/2011 | Minadeo et al. | |
| 2011/0185568 A1 | 8/2011 | Weaver et al. | |
| 2011/0187107 A1 | 8/2011 | Toyohara et al. | |
| 2011/0200425 A1 * | 8/2011 | Weaver | 415/7 |
| 2011/0250077 A1 | 10/2011 | Pedersen | |
| 2011/0260461 A1 | 10/2011 | Egoshi et al. | |
| 2011/0266806 A1 | 11/2011 | Numajiri | |
| 2012/0003096 A1 | 1/2012 | Nakashima et al. | |
| 2012/0074712 A1 * | 3/2012 | Bursal | 290/55 |
| 2012/0134811 A1 | 5/2012 | Bagepalli et al. | |
| 2012/0137481 A1 | 6/2012 | Lindberg et al. | |
| 2012/0161442 A1 | 6/2012 | Chapple | |
| 2012/0181792 A1 * | 7/2012 | Pettersen et al. | 290/55 |
| 2012/0205915 A1 | 8/2012 | Liingaard et al. | |

FOREIGN PATENT DOCUMENTS

| | | | | |
|---|---|---|---|---|
| DE | 102008052412 A1 | 4/2010 | | |
| EP | 1538332 A2 | 6/2005 | | |
| EP | 1566543 A1 | 8/2005 | | |
| EP | 1507975 B1 | 3/2006 | | |
| EP | 1327073 B1 | 12/2007 | | |
| EP | 1878917 A2 | 1/2008 | | |
| EP | 1925583 A1 | 5/2008 | | |
| EP | 1999839 A1 | 12/2008 | | |
| EP | 2003362 A2 | 12/2008 | | |
| EP | 2014917 A1 | 1/2009 | | |
| EP | 1925582 B1 | 6/2010 | | |
| EP | 2084098 B1 | 2/2011 | | |
| JP | 57193781 A | 11/1982 | | |
| JP | 2001200781 A | 7/2001 | | |
| JP | 2003193956 A | 7/2003 | | |
| JP | 2003269316 A | 9/2003 | | |
| JP | 2004218436 A | 8/2004 | | |
| JP | 2004239178 A | 8/2004 | | |
| JP | 2004339953 A | 12/2004 | | |
| JP | 2004353525 A | 12/2004 | | |
| JP | 2005113823 A | 4/2005 | | |
| JP | 2005248738 A | 9/2005 | | |
| JP | 200751584 A | 3/2007 | | |
| JP | 200919625 A | 1/2009 | | |
| JP | 2009513882 A | 4/2009 | | |
| JP | 201031673 A | 2/2010 | | |
| JP | 2010281274 A | 12/2010 | | |
| KR | 20110070623 A | 6/2011 | | |
| TW | 201126062 A1 | 8/2011 | | |
| WO | 2005090780 A1 | 9/2005 | | |
| WO | WO 2007053036 A1 * | 5/2007 | | F03D 7/04 |
| WO | WO 2008086608 A1 * | 7/2008 | | F03D 9/00 |
| WO | 2008113699 A2 | 9/2008 | | |
| WO | WO 2008155053 A2 * | 12/2008 | | F03D 7/02 |
| WO | 2009058022 A1 | 5/2009 | | |
| WO | 2009080712 A2 | 7/2009 | | |
| WO | 2010033035 A1 | 3/2010 | | |
| WO | 2010063291 A2 | 6/2010 | | |
| WO | 2010103086 A2 | 9/2010 | | |
| WO | 2011051369 A2 | 5/2011 | | |
| WO | 2011096053 A1 | 8/2011 | | |

OTHER PUBLICATIONS

Extended European Search Report on Jan. 4, 2013, issued to the corresponding EU application No. 11810527.

International Search Report and Written Opinion mailed Nov. 8, 2011, corresponds to PCT/JP2011/071676.

Decision to Grant a Patent mailed Mar. 16, 2012, corresponds to Japanese patent application No. 2012-503811.

International Search Report and Written Opinion mailed Feb. 21, 2012, corresponds to PCT/JP2011/077625.

International Search Report and Written Opinion mailed Feb. 20, 2012, corresponds to PCT/JP2011/006695.

International Preliminary Report on Patentability mailed Jun. 13, 2013, corresponds to PCT/JP2011/006695.

International Search Report and Written Opinion mailed May 29, 2012, corresponds to PCT/JP2012/054617.

Extended European Search Report issued May 21, 2013, corresponds to European patent application No. 13160517.2.

International Search Report and Written Opinion mailed Mar. 4, 2013, corresponds to PCT/JP2012/004218.

Office Action mailed Aug. 27, 2013, corresponds to Japanese patent application No. 2012-507512.

Decision to Grant a Patent mailed Jan. 16, 2014, corresponds to European patent application No. 11810527.9.

Decision to Grant a Patent mailed Feb. 12, 2014, corresponds Japanese patent application No. 2012-507512.

* cited by examiner

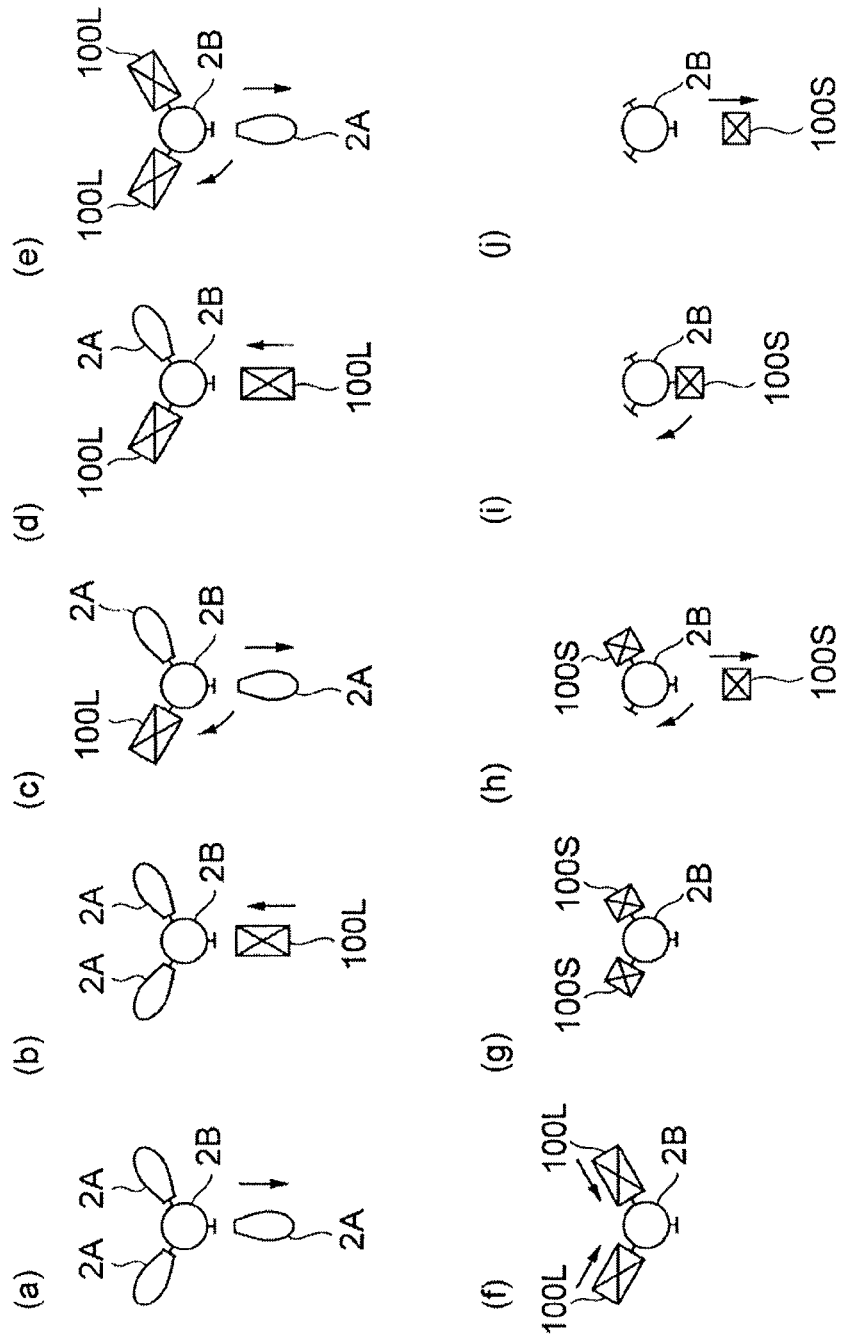

POWER GENERATING APPARATUS OF RENEWABLE ENERGY TYPE AND METHOD OF ATTACHING AND DETACHING BLADE

RELATED APPLICATIONS

This is a continuation application of International Application Number PCT/JP2011/071676, filed Sep. 22, 2011.

TECHNICAL FIELD

The present invention relates to a power generating apparatus of a renewable energy type which generates power by transmitting rotation energy of a rotor via a hydraulic pump and a hydraulic motor and a method of attaching and detaching a blade. The power generating apparatus of renewable energy type generates power from a renewable energy such as wind, tidal current, ocean current and river current and, for instance, includes a wind turbine generator, a tidal generator, an ocean current generator, a river current generator or the like.

BACKGROUND ART

In recent years, from a perspective of preserving the environment, it is becoming popular to use a power generating apparatus of a renewable energy type such as a wind turbine generator utilizing wind power and a renewable energy type turbine generator such as a tidal current generator utilizing tidal. In the power generating apparatus of the renewable energy type, a motion energy of the wind, the tidal current, the ocean current or the river current is converted into the rotation energy of the rotor and the rotation energy of the rotor is converted into electric power by the generator.

In the power generating apparatus of renewable energy type, a rotation speed of the rotor is small in comparison to a rated rotation speed of the generator and thus, a mechanical gearbox is usually provided between the rotor and the generator. By this, the rotation speed of the rotor is increased to the rated rotation speed of the generator before being inputted to the generator.

Between the gearbox and the generator, a braking mechanism (a brake disc and a brake caliper) is also provided. The braking mechanism is provided to brake the rotor and to maintain the rotor in a stopped state. Herein, the brake disc is provided between the gearbox and the generator as a rotation shaft (an output shaft of the gearbox and an input shaft of the generator), which rotates at high speed between the gearbox, and the generator has lower torque, e.g. 1/100 than a rotation shaft (the main shaft) on an upstream side of the gearbox.

Disclosed in Patent Literature 1 (see FIG. 3), is a technology to store a brake disc and a brake caliper inside a casing of the generator.

In recent years, efforts have been made to develop a power generating apparatus of renewable energy type which uses a hydraulic transmission combining a hydraulic pump and a hydraulic motor, instead of the gearbox which is an obstacle to reduce weight and cost of the apparatus.

Although not related to the braking mechanism, disclosed in Patent Literature 4, is a turning device which rotates a main shaft by a hydraulic cylinder via an adapter disc mounted to a strain washer connecting a main shaft and a gearbox of a wind turbine generator. This type of turning device is used for rotating the rotor to a desired angle when attaching and detaching of the blade or the like.

CITATION LIST

Patent Literature

[PTL 1]
U.S. Pat. No. 7,884,493 B
[PTL 2]
US 2010/0032959 A
[PTL 3]
US 2010/0040470 A
[PTL 4]
US 2006/0196288 A

SUMMARY OF INVENTION

Technical Problem

In the power generating apparatus of renewable energy type equipped with the hydraulic transmission disclosed in Patent Literatures 2 and 3, the rotation shaft rotating at high speed between the hydraulic motor and the generator is not connected to the rotor located upstream of the hydraulic transmission. Thus, even when the braking mechanism is provided in the generator input shaft and the generator casing in a conventional manner, the braking mechanism is not useful for braking the rotor or holding the rotor in the stopped state. Therefore, the braking mechanism must be directly installed to the rotor located upstream of the hydraulic transmission.

However, in the case where the braking mechanism is installed to the rotor which is arranged upstream of the hydraulic transmission and rotates at low speed, it is unavoidable to increase the size of the braking mechanism compared to the conventional braking mechanism in order to apply sufficient breaking force to the rotor. It is important how to utilize limited space around the rotor upstream of the hydraulic transmission and also where to arrange the large braking mechanism.

It is not addressed in any of Patent Literatures to install the braking mechanism to the rotor which is upstream of the hydraulic transmission.

In view of the above issues, it is an object of the present invention to provide a power generating apparatus of renewable energy type in which a braking mechanism is attached to a rotor arranged upstream of a hydraulic transmission while saving space, and a method of attaching and detaching a blade for the apparatus.

Means to Solve the Issue

A power generating apparatus of renewable energy type according to the present invention, may include, but is not limited to:

a rotor which comprises a hub and a main shaft, the hub having at least one blade mounted thereon, the main shaft being coupled to the hub;

a generator which generates power by torque inputted from the rotor;

a hydraulic transmission which transmits the torque from the rotor to the generator;

a brake disc which is fixed to the rotor by tightening together with the hub and the main shaft; and a brake caliper which forces a brake pad against the brake disc to apply a braking force to the rotor.

In the power generating apparatus of renewable energy type, the brake disc which is inevitably large in comparison to the conventional case, is fixed to the rotor by tightening together with the hub and the main shaft. This contributes to the space saving.

Normally, when fixing the brake disc to the main shaft, a flange for fixing the brake disc is formed on the main shaft and the brake disc is fastened to the flange. However, this method of fixing the large brake disc raises a space issue. In view of this, in the above power generating apparatus of renewable energy type, the tightening portions of the hub and the main shaft which are essential portions are used to fix the brake disc to the rotor by tightening together with the hub and the main shaft. Thus, it is no longer necessary to provide a separate flange specifically for fixing the brake disc, thereby contributing to saving the space.

The brake caliper may include, but is not limited to, a plurality of outer calipers which are arranged on an outer circumferential side of the brake disc and a plurality of inner calipers which are arranged on an inner circumferential side of the brake disc.

In the above power generating apparatus of renewable energy type, the brake disc is fixed to the rotor which is arranged upstream of the hydraulic transmission and which rotates at low speed, and thus a plurality of the brake calipers are required to apply sufficient breaking force to the rotor. However, it is difficult to arrange enough brake calipers to apply the sufficient braking force to the rotor just on the outer circumferential side of the brake disc. Therefore, by providing the outer calipers on the outer circumferential side of the brake disc and the inner calipers on the inner circumferential side of the brake disc, it is possible to apply sufficient braking force to the rotor.

The above power generating apparatus of renewable energy type may also include:

a nacelle which houses at least the main shaft;

a main shaft bearing which supports the main shaft rotatably on a nacelle side; and a bearing housing which houses the main shaft bearing, and the brake disc may extend toward the bearing housing from a position where the brake disc is tightened together with the hub and the main shaft, and at least one of the brake caliper may be mounted on the bearing housing.

By extending the brake disc to the bearing housing from the position where the brake disc is tightened together with the hub and the main shaft, the position on which the friction force applied by the brake caliper acts, can be closer to a supporting point of the main shaft bearing. By this, even when a total force of the friction forces applied by all the brake calipers 34 has a radial component in the radial direction of the main shaft, it is possible to reduce a moment load (a moment load around main shaft bearing) acting on the main shaft caused by the radial component of the total force of the friction forces. In a manner similar to this, when a turning device is attached to the brake disc to rotate the rotor, it is possible to reduce the moment load on the main shaft caused by a radial component of an external force applied by the turning device.

By directly or indirectly fixing at least one of the brake calipers to the bearing housing, the position on which the friction force applied by the brake caliper acts, can be close to main shaft bearing and the support structure of the brake caliper can be compact and the space and this contributes to the space saving. Particularly, the support member extending from the wall surface of the nacelle and the nacelle baseplate is hard to reach in the space on the inner circumferential side of the brake disc, and it is an important issue how to support the inner calipers. By attaching the brake caliper to the bearing housing, the inner calipers can be easily supported.

The above power generating apparatus of renewable energy type may further include a tower and a nacelle which is supported by the tower and which houses at least the main shaft, and the nacelle may include a nacelle baseplate which is rotatably mounted on the tower, and a nacelle cover which covers the nacelle baseplate, and at least one of the brake caliper may be fixed to an end of the nacelle baseplate which is on a side closer to the hub.

By fixing at least one of the brake calipers to the end of the nacelle baseplate which is on a side closer to the hub, the support structure of supporting the brake caliper can be more compact, thereby saving space.

The main shaft may include a flange which is tightened with the hub and the brake disc and the brake disc may spread outward in a radial direction of the main shaft from a position where the brake disc is tightened with the flange and the hub.

By spreading the brake disc in the radial direction from the position where the brake disc is tightened with the flange and the hub, the brake disc can be formed with a large diameter (i.e. increasing a lever ratio). As a result, significant braking force can be applied to the rotor.

The above power generating apparatus of renewable energy type may further include a nacelle which houses at least the main shaft and a hydraulic cylinder which has one end fixed to the nacelle side and other end fixed to the brake disc, and the rotor is rotated with the brake disc by changing a stroke of the hydraulic cylinder.

By this, the turning operation of the rotor can be performed by the hydraulic cylinder. Further, by fixing the hydraulic cylinder to the brake disc having a comparatively large diameter, even when the load of the rotor is imbalanced during the blade attaching/detaching operation or the like, it is possible to rotate the rotor.

Further, the brake disc is designed with enough strength to withstand a reaction force caused when braking and stopping the rotor which is rotating. Thus, even when high torque is inputted to the rotor from the hydraulic cylinder via the brake disc to perform the turning operation of the rotor in a state that the load of the rotor is imbalanced during the blade attaching/detaching operation or the like, the brake disc is capable of withstanding such motion.

In the case of rotating the rotor together with the brake disc by the hydraulic cylinder, the nacelle may include a nacelle baseplate which is rotatably mounted on the tower, and a nacelle cover which covers the nacelle baseplate, a pair of the hydraulic cylinders may be arranged on both sides of the brake disc respectively, and each of the pair of the hydraulic cylinders may be arranged upright on the nacelle baseplate and fixed to the brake disc via a bracket.

By arranging the pair of the hydraulic cylinders on both sides of the brake disc respectively, it is possible to transmit high torque to the rotor via the brake disc. Thus, it is possible to perform the turning operation of the rotor easily even in a state that the load of the rotor is imbalanced during the blade attaching/detaching operation or the like. Further, by arranging the hydraulic cylinders upright on the nacelle baseplate, the reaction force from the hydraulic cylinders can be received by the nacelle baseplate.

The above power generating apparatus of renewable energy type may further include a locking mechanism which locks the rotor at a desired angular position and the brake disc may be formed with a plurality of first holes in a circumferential direction, and the locking mechanism may be a lock pin which is inserted in one of the first holes and a second hole formed on the nacelle side.

By inserting the lock pin in one of the first holes of the brake disc and the second hole on the nacelle side, the brake disc can be used for the purpose of locking the rotor by the lock pin. In the power generating apparatus of renewable energy type provided with the hydraulic transmission, the locking mechanism must be fixed to the rotor which is on an upstream side of the hydraulic transmission but the space around the rotor is limited for arranging the locking mechanism. Therefore, the use of the brake disc for the purpose of locking the rotor by the lock pin also contributes to the space saving.

The above power generating apparatus of renewable energy type may be a wind turbine generator which rotates the rotor by renewable energy in form of wind and inputs the torque from the rotor to the generator via the hydraulic transmission.

According to the present invention, a method of attaching and detaching a blade for a power generating apparatus of renewable energy type which comprises: a rotor which includes a hub having at least one blade mounted thereon and a main shaft coupled to the hub; a generator which generates power by torque inputted from the rotor; a hydraulic transmission which transmits the torque from the rotor to the generator; a brake disc which is fixed to the rotor by tightening together with the hub and the main shaft; and a brake caliper which forces a brake pad against the brake disc to apply a braking force to the rotor, the method including, but not limited to, the steps of:

rotating the rotor to a desired angular position by a hydraulic actuator;

stopping the rotor at the desired angular position by the brake disc and the brake caliper;

locking the rotor at the desired angular position; and attaching or detaching the blade with respect to the hub in such a state that the rotor is locked.

In the method of attaching and detaching the blade for the power generating apparatus of renewable energy type, the rotor is rotated to the desired angular position by the hydraulic actuator and then, the rotor is stopped at the desired angular position using the brake disc which is fixed to the rotor by tightening the hub and the main shaft together and the brake caliper. Finally, in such a state that the rotor is locked, the blade is attached or detached with respect to the hub.

In this manner, by using the brake disc which is fixed to the rotor by tightening the hub and the main shaft together, it is possible to save the space. Being hardly subjected to the restriction of the space, the brake disc with large breaking force can be used. Therefore, even when the load of the rotor is imbalanced during the blade attaching/detaching operation or the like, the rotor can be stopped firmly at the desired angular position and the blade attaching/detaching operation of the blade can be performed efficiently.

In the above method of attaching and detaching the blade for the power generating apparatus of renewable energy type, the power generating apparatus of renewable energy type may further include a nacelle which houses at least the main shaft, the hydraulic actuator may be a hydraulic cylinder having one end fixed to the nacelle side and other end fixed to the brake disc, and in the step of rotating the rotor, the rotor may be rotated to the desired angular position by rotating the brake disc using the hydraulic cylinder.

By this, the rotor can be rotated to the desired angular position by the turning operation of the rotor by the hydraulic cylinder. Further, by fixing the hydraulic cylinder to the brake disc having a comparatively large diameter, even when the load of the rotor is imbalanced during the blade attaching/detaching operation or the like, it is possible to rotate the rotor.

Further, the brake disc is designed with enough strength to withstand a reaction force caused when braking and stopping the rotor which is rotating. Thus, even when high torque is inputted to the rotor from the hydraulic cylinder via the brake disc to perform the turning operation of the rotor in a state that the load of the rotor is imbalanced during the blade attaching/detaching operation or the like, the brake disc is capable of withstanding such motion.

Furthermore, in the step of rotating the rotor, the rotor may be intermittently rotated by repeating: changing a stroke of the hydraulic cylinder while attaching the other end of the cylinder to the brake disc; and then returning the stroke of the hydraulic cylinder to an original stroke while disconnecting the other end of the hydraulic cylinder from the brake disc.

By rotating the rotor intermittently by the hydraulic cylinder, the rotor can be firmly rotated to the desired angular position.

In the power generating apparatus of renewable energy type provided with the hydraulic transmission, the brake disc is fixed to the rotor which is arranged upstream of the hydraulic transmission and which rotates at low speed, and thus a plurality of the brake calipers are required to apply sufficient breaking force to the rotor. In view of this, it is necessary to provide the brake calipers over a large area of the brake disc in the circumferential direction and the brake calipers tend to interfere with the hydraulic cylinder. Therefore, by intermittently rotating the rotor, the stroke of the hydraulic cylinder for each rotation can be reduced, thereby preventing the interference of the brake calipers with the hydraulic cylinder.

Further, in the step of locking the rotor, the rotor may be locked by fixing a stroke of the hydraulic cylinder.

The stroke of the cylinder may be fixed, for instance, by mechanically latching the piston of the hydraulic cylinder, or by sealing the working chamber of the hydraulic cylinder into a hydraulically locked state to immobilize the piston.

In the above method of attaching and detaching the blade for the power generating apparatus of renewable energy type, the power generating apparatus of renewable energy type may further include a nacelle which houses at least the main shaft, the brake disc may be formed with a plurality of first holes in a circumferential direction, and in the step of locking the rotor, the rotor may be locked by inserting a lock pin in one of the first holes and a second hole formed on the nacelle side.

By inserting the lock pin in one of the first holes of the brake disc and the second hole on the nacelle side, the brake disc can be used for the purpose of locking the rotor by the lock pin. In the power generating apparatus of renewable energy type provided with the hydraulic transmission, the locking mechanism must be fixed to the rotor which is on an upstream side of the hydraulic transmission but the space around the rotor is limited for arranging the locking mechanism. Therefore, the use of the brake disc for the purpose of locking the rotor by the lock pin also contributes to the space saving.

In the case of fixing the rotor by inserting the lock pin in the first hole of the brake disc and the second hole on the nacelle side, the desired angular position may be defined for each of the blades, and the second hole formed on the nacelle side may coincide with one of the first holes formed in the brake disc when the rotor is stopped at the desired angular position defined for each of the blades.

In such a case that the desired angular position appropriate for performing the attaching and detaching of the blades is defined for each of the blades, the first hole and the second hole are formed such as to coincide when the rotor is stopped at the desired angular position defined for each of the blades. By this, it is possible to lock the rotor at the desired angular position appropriate for each of the blades. As a result, the attaching/detaching operation can be performed efficiently.

In the above method of attaching and detaching the blade for the power generating apparatus of renewable energy type, the hydraulic transmission may include a hydraulic pump and a hydraulic motor, the hydraulic pump being driven with rotation of the main shaft to generate pressurized oil, the hydraulic motor driving the generator by the pressurized oil supplied from the hydraulic pump, and in the step of rotating the rotor, the rotor may be rotated to the desired angular position by driving the hydraulic pump as the hydraulic actuator with pressurized oil supplied from a pressurized-oil source.

In this manner, the pressurized oil is supplied to the hydraulic pump from the pressurized-oil source and the hydraulic pump is driven by the pressurized oil. Thus, the rotor can be rotated to the desired angular position using the hydraulic pump of the hydraulic transmission without providing a separate hydraulic actuator for rotating the rotor.

The above method of attaching and detaching the blade for the power generating apparatus of renewable energy type, may further include the steps of attaching a dummy blade to the hub before the step of rotating the rotor, and, in the step of rotating the rotor, the rotor may be rotated in such a state that the dummy blade is attached to the hub.

In this manner, by reducing the imbalance of the load of the rotor (the moment around the center axis of the rotor) during the attaching/detaching of the blade using the dummy blades, the rotor can be rotated to the desired angular position with low torque. Therefore, it is possible to reduce the size of the hydraulic actuator.

In the case of rotating the rotor by attaching the dummy blade to the hub, the dummy blade may include a tubular member which is fixed to the hub and a movable weight which is supported inside the tubular member, and the method may further include the step of adjusting a position of the movable weight to reduce a moment around a center axis of the rotor before the step of attaching the dummy blade.

By adjusting the position of the movable weight to reduce the moment around the center axis of the rotor, it is possible to rotate the rotor to the desired angular position with low torque.

Effects of the Invention

According to the present invention, the brake disc is fixed to the rotor by tightening the hub and the main shaft together with use of the tightening portions of the hub and the main shaft, which are essential portions. Thus, it is no longer necessary to provide a separate flange specifically for fixing the brake disc, thereby contributing to saving the space.

BRIEF DESCRIPTION OF DRAWINGS

FIG. 10 illustrates a process of detaching the blades using the dummy blade.

DESCRIPTION OF EMBODIMENTS

Embodiments of the present invention will now be described in detail with reference to the accompanying drawings. It is intended, however, that unless particularly specified, dimensions, materials, shape, its relative positions and the like shall be interpreted as illustrative only and not limitative of the scope of the present.

In embodiments of the present invention described hereinafter, a wind generator is described as an example of the power generating apparatus of renewable energy type. However, the present invention is not limited to this and can be applied to other types of power generating apparatus such as a tidal generator, an ocean current generator and a river current generator.

First Embodiment

Figure 1:
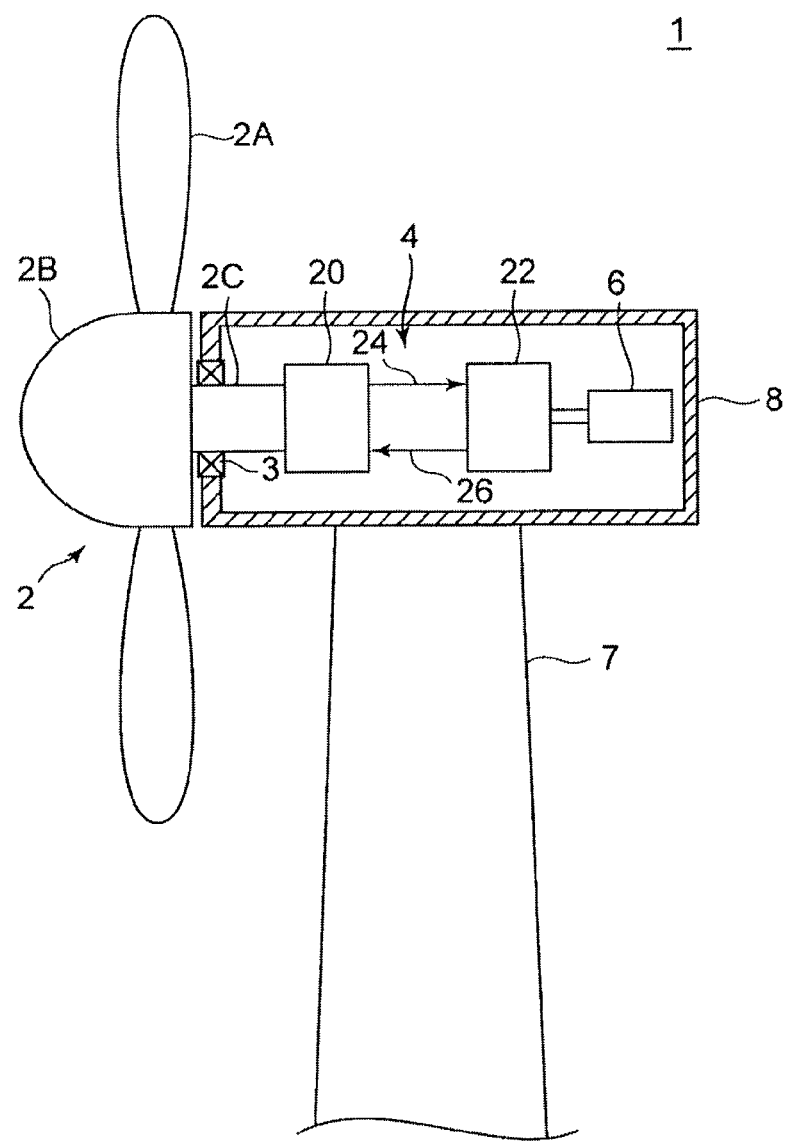
FIG. 1 shows a configuration example of a wind turbine generator of a first embodiment.
Figure 2:
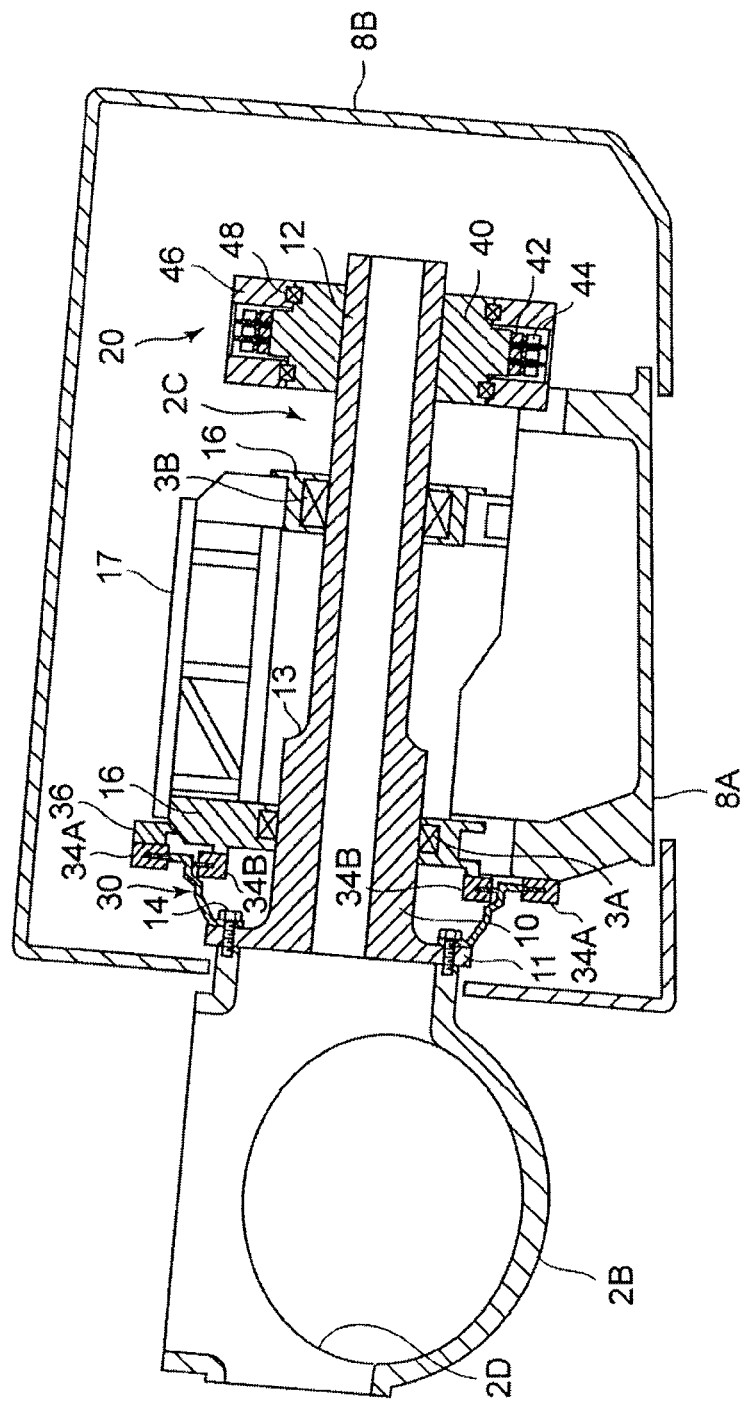
FIG. 2 shows a cross-sectional view of a structure inside a nacelle of the wind turbine generator.
Figure 3:
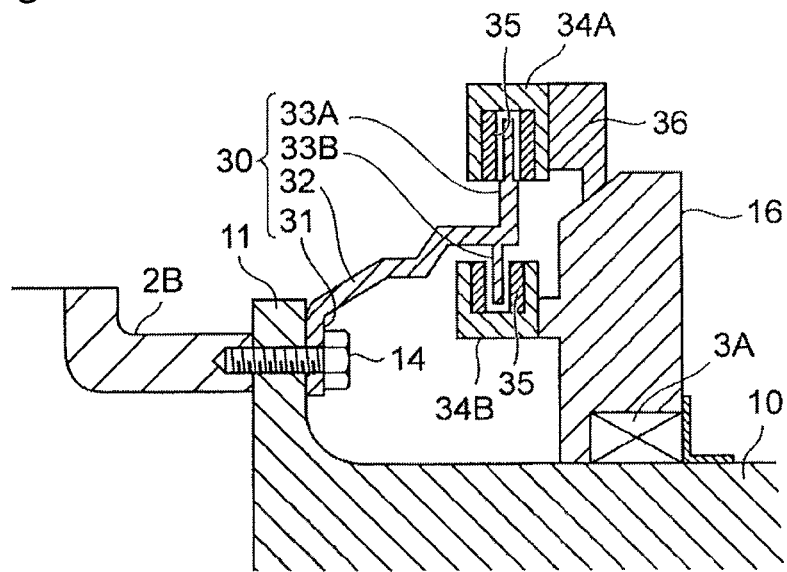
FIG. 3 shows a detailed configuration around a brake disc.
Figure 4:
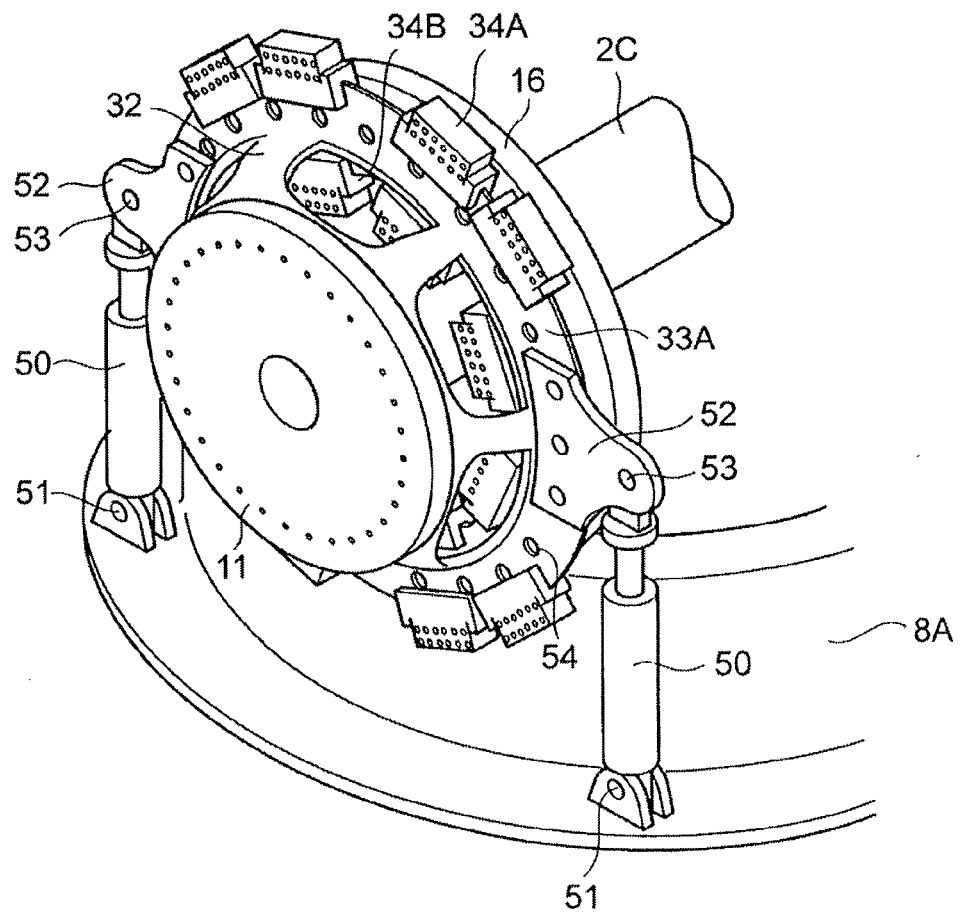
FIG. 4 is a perspective view of a main shaft and the brake disc taken from a hub side.
Figure 5:
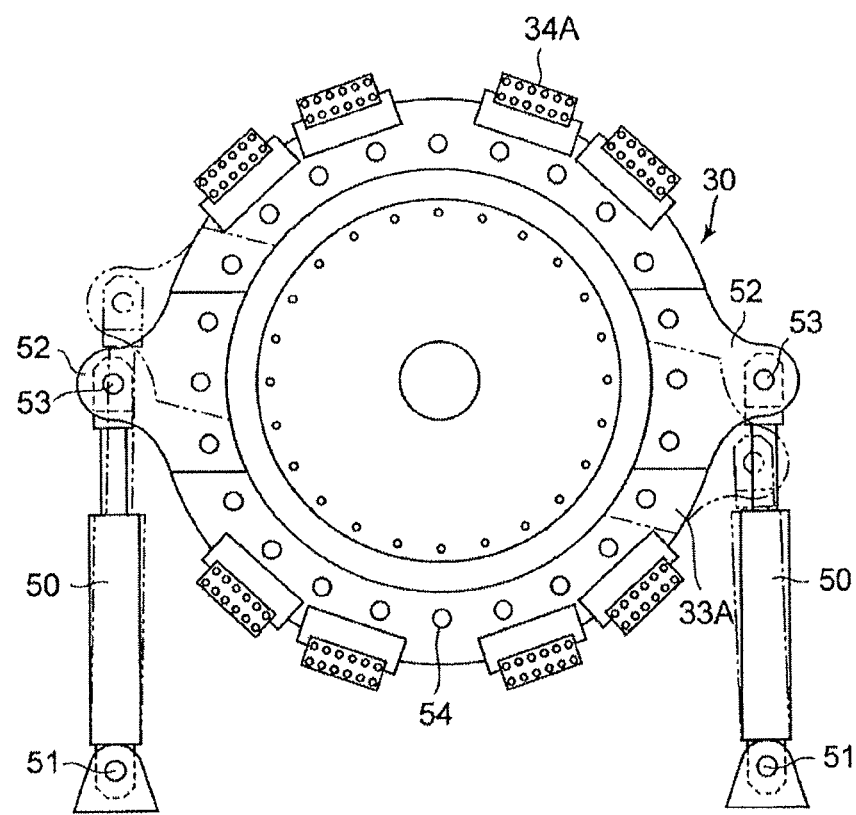
FIG. 5 shows a state that a hydraulic cylinder for a rotor turning operation is attached to the brake disc.

FIG. 1 shows a configuration example of a wind turbine generator of a first embodiment. FIG. 2 shows a cross-sectional view of a structure inside a nacelle of the wind turbine generator. FIG. 3 shows a detailed configuration around a brake disc. FIG. 4 is a perspective view of a main shaft and the brake disc taken from a hub side. FIG. 5 shows a state that a hydraulic cylinder for turning a rotor is attached to the brake disc.

As shown in FIG. 1, the wind turbine generator 1 mainly includes a rotor 2 which rotates upon receiving wind, a hydraulic transmission 4 which increases the rotation of the rotor 2 and a generator which generates power.

The rotor 2 includes blades 2A, a hub 2B to which the blades 2A are attached and a main shaft 2C which is connected to the hub 2B. By this, the entire rotor 2 rotates by wind power received on the blades 2A and the rotation is inputted from the main shaft 2C to the hydraulic transmission 4.

The main shaft 2C of the rotor 2 is housed in a nacelle which is rotatably supported by a tower 7. The main shaft 2C is supported rotatably on the nacelle side by means of a main shaft bearing 3. One or a plurality of the main shaft bearing 3 may be provided.

The hydraulic transmission 4 is provided with a hydraulic pump 20 driven by the rotation of the main shaft 2C, a hydraulic motor 22 connected to the generator 6, and a high-pressure oil line 24 and a low-pressure oil line 26 that are provided between the hydraulic pump 20 and the hydraulic motor 22.

The high-pressure oil line 24 is provided between a discharge side of the hydraulic pump 20 and an intake side of the hydraulic motor 22. The low-pressure oil line 26 is provided between an intake side of the hydraulic pump 20 and a discharge side of the hydraulic motor 22. Operating oil discharged from the hydraulic pump 20, i.e. high-pressure oil, enters the hydraulic motor 22 via the high-pressure oil line 24 to drive the hydraulic motor 22. By this, the generator 6 connected to the hydraulic motor 22 generates power.

The operating oil having worked in the hydraulic motor 22, i.e. low-pressure oil, enters the hydraulic pump 20 via the low-pressure oil line 26 to increase a pressure of the operating oil in the hydraulic pump 20 and then returns to the hydraulic motor 22 via the high-pressure oil line 24.

FIG. 1 shows the example where the hydraulic transmission 4 and the generator 6 are arranged in the nacelle 8. However, this is not limitative and a part of or all of the hydraulic transmission 4 and the generator 6 may be arranged in the tower 7. For instance, the hydraulic pump 20 of the hydraulic transmission 4 may be housed in the nacelle 8 while the hydraulic motor 22 and the generator 6 are housed in the tower 7.

In reference to FIG. 2, a detailed structure around the main shaft 2C of the rotor 2 is explained.

The main shaft 2C has a front part 10 which is on a side closer to the hub 2B and a rear part 12 which is on a side farther from the hub 2B. Between the front part 10 and the rear part 12, a stepped portion 13 is formed such that the front part 10 has a larger diameter than the rear part 12.

In the example shown in FIG. 2, the main shaft 2C is supported by a pair of main shaft bearings 3 (3A, 3B). Specifically, the main shaft bearing 3A on the front supports the front part 10 of the main shaft 2C, whereas the main shaft bearing 3B on the rear supports the rear part 12 of the main shaft 2C. The main shaft bearings 3 (3A, 3B) are housed in bearing housings 16 respectively. From the purpose of enhancing stiffness against bending moment or the like of the rotor 2, the bearing housings 16 are connected by a connection frame 17 and the nacelle 8.

Each of the bearing housing 16 is supported on the nacelle side. For instance, when the nacelle 8 includes a nacelle baseplate 8A supported rotatably by the tower 7 and a nacelle cover 8B covering the nacelle baseplate 8A, each of the bearing housings 16 may be supported by the nacelle baseplate 8A or may be supported by the nacelle cover 8B. The nacelle cover 8B is supported by a reinforcement member (frame) of the nacelle 8 and the nacelle baseplate 8A.

The front part 10 of the main shaft 2c extends outward in the radial direction of the main shaft 2C at an end part which is on the side closer to the hub 2B to form a flange 11. The flange 11 of the front part 10 is fastened to the hub 2B by a bolt 14. Meanwhile, the brake disk 30 which stops the rotor 1, is fastened with the flange and the hub 2B. A detailed configuration of the brake disc 30 is explained later.

At the rear part 12 of the main shaft 2C, the main shaft bearing 3B on the rear and the hydraulic pump 20 are provided as shown in FIG. 2. FIG. 2 illustrates the example where the hydraulic pump 20 is provided downstream of the main shaft bearing 3B. However, this is not limitative and the hydraulic pump 20 may be provided between the main shaft bearings 3A and 3B, or be formed integrally with the main shaft bearing 3B, i.e., the main shaft bearing 3B also functions as a pump bearing for the hydraulic pump 3B.

Although not particularly limited to this, the hydraulic pump 20 is, for instance, provided on the outer periphery of the rear part 12 of the main shaft 2C such that the rotation of the main shaft 2C causes a plurality of pistons 44 upward and downward to raise the pressure of the operating oil, as shown in FIG. 2. Specifically, the hydraulic pump 20 may be provided with a cylindrical member 40, a ring cam 42, the pistons 44, a casing 46 and a pump bearing 48. The cylindrical member 40 is fixed to the outer periphery of the rear part 12 of the main shaft 2C. The ring cam 42 is an annular member which is fixed to the outer periphery of the cylindrical member 40 and is formed with a wave-like cam profile with depressions and projections to move the pistons upward and downward. The pistons 44 are formed by arrays of groups of pistons, that are arranged in the longitudinal direction of the main shaft 2C, each array including a plurality of pistons arranged in the circumferential direction. FIG. 2 shows the exemplary configuration where three arrays of groups of pistons are disposed in the longitudinal direction. The pistons 44 are housed in the casing 46. Between the casing 46 and the cylindrical member 40, the pump bearing 48 is provided.

As shown in FIG. 3, the brake disc 30 includes a tightening portion 31, a middle portion 32 and a disc portion 33. The tightening portion 31 is tightened together with the hub 2B and the flange 11 by the bolt 14. The middle portion 32 bends and extends from the tightening portion 31 toward the bearing housing 16 of the main shaft bearing 3A. The disc portion 33 is disposed at the end of the middle portion 32.

The tightening portion 31 extends in the radial direction of the main shaft 2C along the flange 11 of the main shaft 2C. The tightening portion 31 has a circular ring shape. The middle portion 32 extends toward the bearing housing 16 of the main shaft bearing 3A while spreading outward in the radial direction of the main shaft 2 from a position where the flange 11 of the front part 10 and the hub 2B are tightened together (i.e. a position of the bolt 14). At the end of the middle portion 32, which is on the bearing housing side, the disc portions 33 (33A and 33B) are provided on both outer and inner circumferential sides. The outer disc portion 33A extends outward in the radial direction of the main shaft 2C, whereas the inner disc portion 33B extends inward in the radial direction of the main shaft 2C.

In the brake disc of the above configuration, the middle portion 32 of the brake disc 30 is provided so that the brake disc 30 spreads outward in the radial direction of the main shaft 2C from the position where the flange 11 of the main shaft 2C and the hub 2B are tightened together. This increases a lever ratio, thereby applying a significant breaking force to the rotor 2. Specifically, by providing the middle portion 32 spreading outward in the radial direction, the disc portion 33, to which a friction force is applied by a break caliper, can be provided much far from the axial center of the main shaft 2C in the radial direction. By this, even when the friction force by the brake caliper 34 is small, significant breaking force can be applied to the rotor 2. The brake caliper is explained in details later.

Further, by providing the middle portion 32, which extends toward the bearing housing 16 of the main shaft bearing 3A from the position where the hub 2B and the main shaft 2C are fastened together, the disc portion 33 to which the friction force is applied from the brake caliper 34, can be provided closer to the main shaft bearing 3A which is a supporting point of the main shaft 2C. Specifically, a distance between the disc portion 33 and the main shaft bearing 3A in the axial direction of the main shaft 2C can be reduced. By this, even when a total force of the friction forces by all the brake calipers 34 has a radial component of the main shaft 2C, it is possible to reduce a moment load acting on the main shaft 2C caused by the radial component of the main shaft 2C.

The brake caliper 34 (34A, 34B) is, as shown in FIG. 3 and FIG. 4, arranged to straddle the disc portion 33 (33A, 33B). The brake caliper 34 includes a plurality of outer calipers 34A which are provided in correspondence with the outer disc portion 33A on the outer circumferential side of the brake disc 30, and a plurality of inner calipers 34B which are provided in correspondence with the inner disc portion 33B of the brake disc 30.

In this manner, by providing a plurality of the brake calipers 34 (the outer caliper 34A and the inner caliper 34B) on both the inner and outer circumferential sides of the brake disc 30, sufficient braking force can be applied to the rotor 2.

Each of the brake calipers 34 (34A, 34B) forces a brake pad 35 against the disc portion 33 (33a, 33B) of the brake disc by hydraulic pressure so as to apply the braking force to the rotor 2. The brake caliper 34 is directly or indirectly supported by the bearing housing 16 of the front main shaft bearing 3A or the nacelle baseplate 8A.

For instance, as shown in FIG. 2 and FIG. 4, the outer calipers disposed in an upper part of the brake disc 30 may be fixed to the bearing housing 16 of the main shaft bearing 3A via a support member 36, whereas the outer calipers 34A disposed in a lower part of the brake disc 30 may be directly fixed to an end part of the nacelle baseplate 8A which is on the side closer to the hub 2B (i.e. a front part of a side panel installed upright from a floor surface of the nacelle baseplate 8A). The inner calipers 34B entirely may be directly or indirectly fixed to the bearing housing 16 of the main shaft bearing 3A.

In this manner, by directly or indirectly fixing the brake caliper 34 (a part of the outer calipers 34*a* and the inner calipers 34) to the bearing housing 16, the position on which the friction force applied by the brake caliper 34 acts, can be close to main shaft bearing 3A and the support structure of the brake caliper 34 can be compact. Particularly, a space on the inner circumferential side of the brake disc 30 is covered by the middle portion 32 (see FIG. 3) and it is hard to reach the support member extending from the wall surface of the nacelle cover 8B and the nacelle baseplate 8A and thus, the inner calipers 34B are fixed to the bearing housing 16 to simplify the support structure of the inner calipers 34B.

In contrast, the brake caliper 34 (the outer calipers disposed in the lower part of the brake disc 30) are fixed to the end of the nacelle baseplate 8A which is on the side closer to the hub 2B to simplify the support structure of the brake caliper 34.

A hydraulic cylinder may be installed to the brake disc 30 to perform a turning operation of the rotor 2.

For instance, as shown in FIG. 4 and FIG. 5, the hydraulic cylinders 50 may be fixed to the brake disc 30 via brackets 52. The hydraulic cylinders 50 are installed upright on the nacelle baseplate 8A, having one end fixed to the nacelle baseplate 8A and other end fixed to the brake disc 30 via the bracket 52. The bracket 52 is fastened to the brake disc 30 by means of a plurality of fixing holes 54 formed in the entire circumference of the outer disc portion 33A of the brake disc 30. The bracket 52 is fixed to the outer disc portion 33 in an area where the outer calipers 34A are not provided.

The hydraulic cylinder 50 is attached rotatably at a connection part 51 connecting the hydraulic cylinder 50 to the nacelle baseplate 8A and at a connection part 53 connecting the hydraulic cylinder 50 to the bracket 52. The hydraulic cylinder 50 moves around the connection parts 51 and 53 in accordance with a rotation amount of the brake disc 30. FIG. 5 shows a movement of the hydraulic cylinders 50 around the connection parts 51 and 53 by dotted lines.

By attaching the hydraulic cylinder 50 to the brake disc 30, the rotor 2 rotates with the brake disc 30 by changing the stroke of the piston by moving the piston forward and backward by the hydraulic cylinder 50 and thus, it is now possible to perform the turning operation of the rotor 2. Further, as the brake disc (specifically, the outer disc portion 33A) has comparatively a large diameter, it is easy to rotate the rotor when the load of the rotor 2 is imbalanced during a blade attaching/detaching operation of the blade 2A or the like.

Furthermore, the brake disc 30 is designed with enough strength to withstand a reaction force caused when braking and stopping the rotor 2 which is rotating. Thus, even when high torque is inputted to the rotor 2 from the hydraulic cylinder 50 via the brake disc 30 to perform the turning operation of the rotor 2 in a state that the load of the rotor 2 is imbalanced during the blade attaching/detaching operation or the like, the brake disc 30 is capable of withstanding such motion.

The hydraulic cylinders 50, as shown in FIG. 4 and FIG. 5, are preferably provided on both sides of the brake disc 30. In such case, as shown in FIG. 5, the hydraulic cylinders 50 turn the brake disc 30 by moving the pistons in opposite directions to each other. Specifically, one of the cylinders 50 applies an upward pushing force in the vertical direction to the brake disc 30, whereas the other of the cylinders 50 applies a downward pushing force in the vertical direction to the brake disc 30. Thus, the radial components of the pushing forces by the hydraulic cylinders 50 cancel one another mostly and the moment load to the main shaft 2C caused by the radial component of the total force of the pushing forces of the hydraulic cylinder 50 can be reduced.

In this manner, by arranging a pair of the hydraulic cylinders 50 on both sides of the brake disc 30 respectively, it is possible to transmit high torque to the rotor 2 via the brake disc 30. Thus, it is possible to perform the turning operation of the rotor 2 easily even in a state that the load of the rotor 2 is imbalanced during the blade attaching/detaching operation or the like. Further, by arranging the hydraulic cylinders 50 upright on the nacelle baseplate 8A, the reaction force from the hydraulic cylinders 50 can be received by the nacelle baseplate.

For the purpose of increasing the braking force to the rotor 2, it is necessary to provide the outer calipers 34A over a large area of the outer portion 33A in the circumferential direction. Thus, it is difficult to increase the stroke amount of the hydraulic cylinder 50 as the outer calipers 34A could interfere with the hydraulic cylinder 50 and the bracket 52.

In view of this, the rotor may be rotated intermittently by repeating the turning operation by means of the hydraulic cylinders 50. Specifically, the hydraulic cylinder 50 is attached to the brake disc 30 via the bracket 52, a stroke of the cylinder 50 is changed, and then the rotor is rotated by a prescribed angle. Next, the bracket 52 is detaching the bracket 52 from the brake disc 30, the hydraulic cylinder 50 is disconnected from the brake disc 30 and then the stroke of the hydraulic cylinder 50 is returned to an original stroke. Subsequently, the hydraulic cylinder 50 is attached again to the brake disc 30 via the bracket 52, the stroke of the cylinder 50 is changed, and then the rotor is rotated by a prescribed angle. By repeating the above steps, it is possible to rotate the rotor 2 intermittently.

With use of the fixing holes 54 of the brake disc 30, a locking mechanism may be provided to lock the rotor 2.

Figure 6:
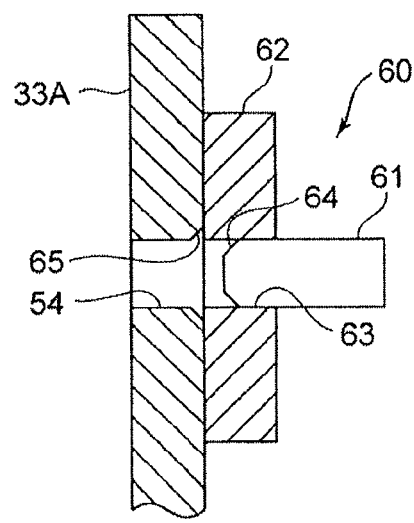
FIG. 6 shows a configuration example of a rotor locking mechanism which uses a fixing hole for the brake disc.

FIG. 6 shows a configuration example of a rotor locking mechanism which uses the fixing holes 54 of the brake disc 30. As shown in the drawing, the locking mechanism 60 includes a lock pin 61. The lock pin 61 is configured to be inserted in one of first holes (fixing holes) 54 formed in the brake disc 30 and in a second hole 63 formed in a stationary member 62 which is fixed to the nacelle side. The stationary member 62 is fixed to the nacelle baseplate 8A, the nacelle cover 8B, the bearing housing 16 of the main shaft bearing 3A or the like.

By inserting the lock pin 61 in the first hole (the fixing hole) 54 of the brake disc and the second hole 63 on the nacelle side, the brake disc 30 can be used for the purpose of locking the rotor 2 by the lock pin 61, resulting in saving the space.

As shown in FIG. 6, a corner of a tip surface of the lock pin 61 and a corner 65 of an opening edge surface of the first fixing hole 54 of the brake disc 30 may be chamfered, thereby making insertion of the lock pin 61 smooth. The corners 64 and 65 may be chamfered by chamfering the corners into inclined surfaces of approximately 45 degree or by round chamfering the corners.

The insertion of the lock pin 61 into the first hole 54 and the second hole 63 may be automated. For instance, a rotational displacement (an angular position) of the rotor 2 may be detected by a rotary encoder, and based on the detection result, it is determined whether or not the first hole 54 coincides with the second hole 63. When it is determined that the first hole 54 coincides with the second hole 63, the lock pin 61 may be automatically inserted in the first hole 54 and the second hole 63 by an actuator.

A method of attaching and detaching the blade 2A in the wind turbine generator 1 having the above configuration is explained below.

In the wind turbine generator 1 provided with a plurality of blades 2A, it is necessary to lock the rotor at an angular position appropriate for attaching or detaching each of the blades 2A, i.e. "a desired angular position". For instance, in order to attach the blade 2A, firstly the blade 2A is lifted close to the hub 2B by a crane, and secondly in such a state that the blade 2A is positioned vertically or horizontally, the rotor 2 is locked at an angular position where a blade root of the blade 2A coincides with a blade fixing hole of the hub 2B (see 2D in FIG. 2).

In the present embodiment, the rotor 2 is rotated to a desired angular position by means of the hydraulic cylinder 50 and then locked at the desired angular position by the locking mechanism 60. A process of locking the rotor 2 at the angular position appropriate for attaching or detaching each of the blades, is described below.

First, in a state that the brake by the brake disc 30 and the brake caliper 34 is released, the rotor 2 is rotated with the brake disc 30 to the desired angular position using the hydraulic cylinder 50. Meanwhile, the rotor may be intermittently rotated by repeating the above process (attaching the hydraulic cylinder 50 to the brake disc 30→changing the stroke of the hydraulic cylinder 50→disconnecting the hydraulic cylinder 50 from the brake disc 30→returning the stroke of the hydraulic cylinder 50 to the original stroke).

Once the rotor 2 is rotated to the desired angular position, the braking force is applied to the rotor 2 by the brake disc 30 and the brake caliper 34 to stop the rotor 2 at the desired angular position. Specifically, hydraulic pressure is applied to the brake caliper 34 to force the brake pad 35 against the disc portion 33 of the brake disc 30 by the hydraulic pressure. As a result, the breaking force is applied to the rotor 2 and the rotor 2 is stopped at the desired angular position.

Next, the lock pin 61 is inserted in the first hole (the fixing hole) 54 of the brake disc 30 and the second hole 63 of the stationary member 62 to lock the rotor 2 at the desired angular position and the rotor is immobilized in a rotational direction. Further, the first hole 54 and the second hole 63 are formed such that the second hole 63 of the stationary member 62 coincides with the first hole (the fixing hole) 54 of the brake disc 30 in such a state that the rotor 2 is stopped at the desired angular position. In the case where the blades 2A have different desired angular positions of the rotor 2, a plurality of the first holes (the fixing holes) 54 are formed in the brake disc 30 preferably in such a manner that the second hole 63 coincides with the first hole 54 when the rotor 2 is rotated to the desired angular positioned defined for each of the blades 2A.

For the purpose of stopping and locking the rotor 2 at the desired angular position, the stroke of the hydraulic cylinder 50 may be fixed. To fix the stroke of the stroke of the hydraulic cylinder 50, for instance, the piston of the hydraulic cylinder 50 may be immobilized by mechanically latching the piston, or by sealing the working chamber of the hydraulic cylinder 50 into a hydraulically locked state.

Once the rotor 2 is locked at the desired angular position, the blade attaching/detaching operation of the blade 2A with respect to the hub 2B is performed. For instance, when attaching the blade 2A turning operation to the hub 2B, with the rotor locked at the desired angular position, the blade root of the blade 2A is attached at the blade fixing hole 2D of the hub 2B to fix the blade 2A to the hub 2B.

As described above, the wind turbine generator 1 of the present embodiment is provided with the brake disc 30 fixed to the rotor 2 by tightening the hub 2B and the main shaft 2C together, and the brake caliper 34 which applies the braking force to the rotor 2 by forcing the brake pad 35 against the disc portion 22 of the brake disc 30.

According to the wind turbine generator 1, the brake disc 30 is fixed to the rotor 2 by fastening the hub 2B and the main shaft 2C together with use of the tightening portions of the hub 2B and the main shaft 2C, which are essential portions. Thus, it is no longer necessary to provide a separate flange specifically for fixing the brake disc, thereby contributing to saving the space.

Further, in the present embodiment, when performing the blade attaching/detaching operation of the blade 2A of the wind turbine generator 1, the rotor 2 is rotated to the desired angular position by the hydraulic cylinder 50 and then, the rotor 2 is stopped at the desired angular position using the brake disc 30 which is fixed to the rotor by tightening the hub 2B and the main shaft 2C together and the brake caliper 34. Finally, with the rotor 2 being locked, the blade 2A is attached or detached with respect to the hub 2B.

In this manner, by using the brake disc 30 which is fixed to the rotor 2 by tightening the hub 2B and the main shaft 2C together, it is possible to conserve the space. Being hardly subjected to the restriction of the space, the brake disc 30 with large breaking force can be used. Therefore, even when the load of the rotor 2 is imbalanced during the blade attaching/detaching operation or the like, the rotor 2 can be stopped firmly at the desired angular position and the blade attaching/detaching operation of the blade 2A can be performed efficiently.

Second Embodiment

A wind turbine generator and a method of attaching and detaching the blade in relation to the second embodiment are explained below. In the wind turbine generator of the second embodiment, the rotor 2 is turned by the hydraulic pump 20 functioning as a motor without using the hydraulic cylinder 50. The rest of the structure is substantially the same as the wind turbine generator 1 of the first embodiment. Thus, mainly the part of the structure different from the first embodiment is explained.

Figure 7:
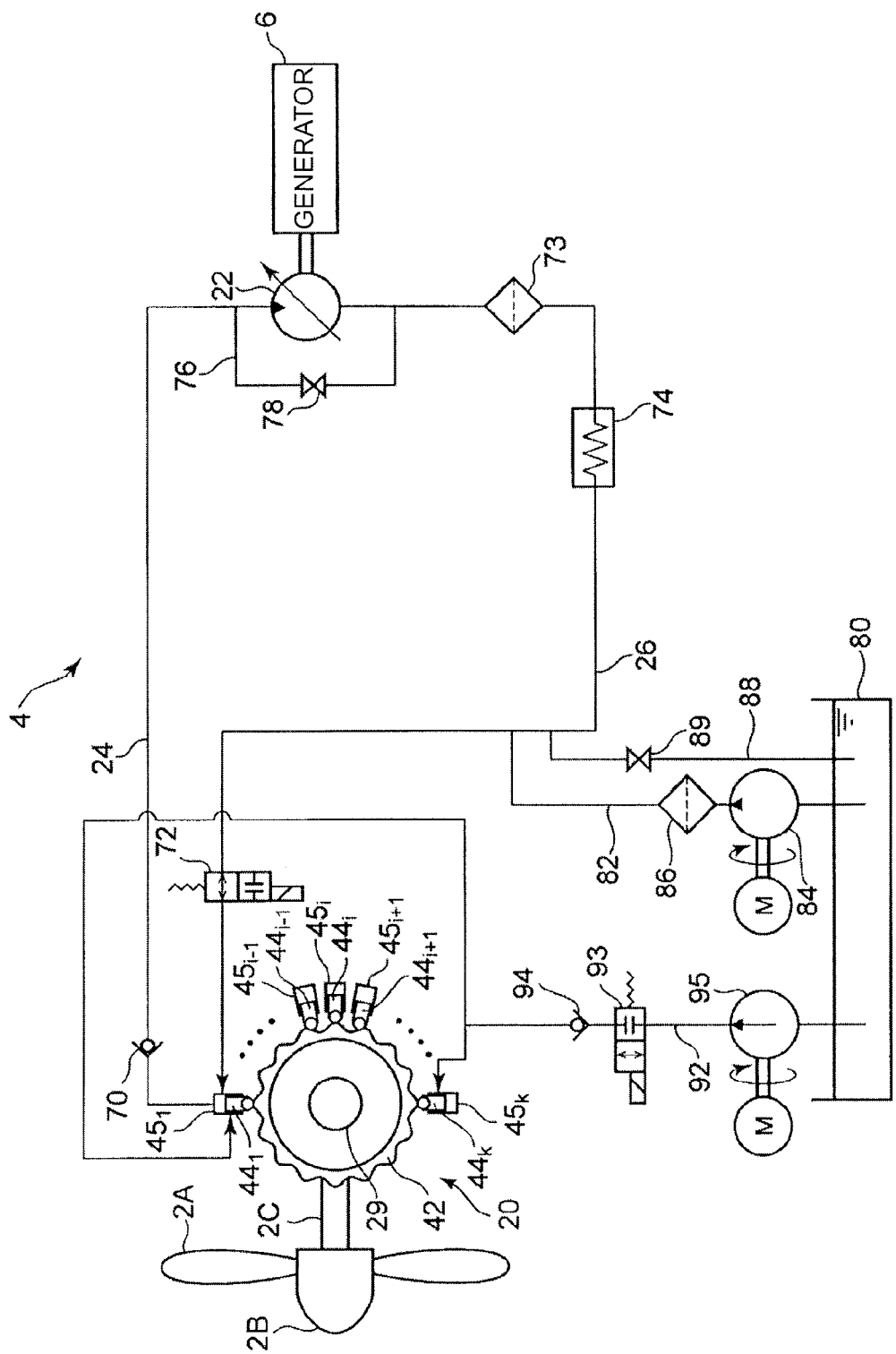
FIG. 7 shows a configuration example of a hydraulic circuit around the hydraulic pump of the wind turbine generator of a second embodiment.

FIG. 7 shows a configuration example of a hydraulic circuit around the hydraulic pump of the wind turbine generator of the second embodiment.

As shown FIG. 7, the hydraulic pump 20 having the same configuration as the first embodiment is attached to the main shaft 2C of the rotor 2. Specifically, the ring cam 42 is attached to the outer periphery of the main shaft 2C via the cylindrical member 40. And a plurality of pistons $44i$ ($I=1\sim m$) are arranged on the ring cam in the circumferential direction of the main shaft 2C and a plurality of working chambers $45i$ ($i=1\sim m$) are formed by the pistons $44i$ and the cylinders housing the pistons $44i$.

Each of the working chambers $45i$ is connected to the high-pressure oil line 70 and the low-pressure oil line 26 via a high-pressure valve 70 and a low-pressure valve 72 respectively. The high-pressure valve 70 and the low-pressure valve 72 are opened and closed in response to movement of the ring cam 42. By this, a pressure of the operating oil supplied to the working chamber 45$i$ from the low-pressure oil line 26 via the low-pressure valve 72 is raised by the piston 44$i$ and then the operating oil is discharged from the working chamber 45$i$ to the high-pressure oil line 24 via the high-pressure valve 70.

In the configuration example of FIG. 7, the high-pressure valve 70 is a check valve which allows only a flow of the operation oil flowing from the working chamber 4$i$ to the high-pressure oil line 24, and the low-pressure valve 72 is a solenoid valve of normal open type. However, the configurations of the high-pressure valve 70 and the low-pressure valve 72 are not limited to this example.

In the low-pressure oil line 26, an oil filter 73 which removes impurities contained in the operating oil and an oil cooler 74 which cools the operating oil, are provided. Further, an oil tank 80 is connected to the low-pressure oil line 26 via a replenishing line 82 and a return line 88.

In the oil tank 80, operating oil for replenishing is stored. The operation oil stored in the oil tank 80 is pumped by a boost pump 84 provided in the replenishing line 82 and is supplied to the low-pressure oil line 26. Meanwhile, the operating oil supplied to the low-pressure oil line 26 is passed through the oil filter 86 provided in the replenishing line 82 to remove impurities from the operating oil. In this manner, by replenishing the operation oil to the low-pressure oil line 26, even when the operation oil leaks, it is possible to maintain the amount of the operating oil circulating in the hydraulic transmission 4. Further, a relief valve 89 is provided in the return line 88 between the low-pressure oil line 26 and the oil tank 80 and the pressure in the low-pressure oil line 26 is kept near a setting pressure of the relief valve 89.

Furthermore, a bypass passage 76 is provided between the high-pressure oil line 24 and the low-pressure oil line 26 to bypass the hydraulic motor 22. In the bypass passage 76, a relief valve 78 which maintains the pressure of the operating oil in the high-pressure oil line 24 not lower than a setting pressure. Thus, when the pressure of the operating oil in the high-pressure oil line 24 rises to the setting pressure of the relief valve 78, the relief valve 78 automatically opens to allow the high-pressure oil to escape to the low-pressure oil line 26 via the bypass passage 76.

In the second embodiment, a supply path 92 for supplying pressurized oil for performing the motoring operation of the hydraulic pump 20, aside from the normal operation of the hydraulic pump 20 (i.e. a pumping operation for increasing the pressure of the operating oil supplied from the low-pressure oil line 26 and discharging the operating oil to the high-pressure oil line 24).

FIG. 7 shows the supply line 92 provided between the oil tank 80 storing the low-pressure oil line and the working chambers 45$i$ and 45$k$. On an upstream side of a solenoid valve 93 in the supply path 92, a pump 95 is provided as a pressurized-oil source. The operating oil is pumped from the oil tank 80 by the pump 95 and supplied via the solenoid valve 93 and a check valve 94 to the working chambers 45$l$ and 45$k$ as the pressurized oil.

FIG. 7 shows the configuration example where the pump 95 is provided as the pressurized-oil source besides the boost pump 84 provided in the replenishing line 82. However, this is not limitative and the boost pump 84 may function as the pressurized-oil source in addition to the function of pumping the operating oil from the oil tank.

In order to drive the hydraulic pump 20 with the pressurized oil from the pump 95 and to cause the hydraulic pump 20 to perform the motoring operation, opening and closing of the solenoid valve 93 and the low-pressure valve 72 are controlled in conjunction with a cycle of the reciprocation motion of the piston 44.

Specifically, in a cycle of the piston 44 moving from a bottom dead center and reaching a bottom dead center, the solenoid valve 93 is opened and the low-pressure valve 72 is closed. By this, the pressurized oil is supplied from the pump (the pressurized-oil source) 95 to the working chamber 45 and the piston is pushed upward by the pressurized oil, thereby rotating the ring cam 42 (a motor cycle). In contrast, in a cycle of the piston 44 moving from the bottom dead center and reaching the top dead center, the solenoid valve 93 is closed and the low-pressure valve 93 is opened. By this, the pressurized oil having lifted the piston 44 in the working chamber 45, is discharged to the low-pressure oil line 26 via the low-pressure valve 72.

The hydraulic pump 20 is normally designed with reciprocating cycles displaced in phase for the pistons 44$i$ for the purpose of preventing pulsation and controlling a displacement $D_P$ with precision. Further, it is normally designed for the purpose of preventing the pulsation and performing the fine control of the displacement such that a plurality of groups of the pistons 44$i$ are provided and at least two pistons of the group have the same phase in reciprocating motion cycle so that, even when one of the pistons fail, other pistons of the same groups as the failed piston can continue. In the configuration example of FIG. 7, the shape of the ring cam 42 is determined in such a manner that the piston 44$l$ and the piston 44$k$ on the opposite side of the piston 44$l$ repeat the reciprocating motion in the same phase. In this manner, when the number of the pistons 44 repeating the reciprocating motion in the same phase is 'n' (n=2 in this example), redundancy is 'n'.

The pistons 44$l$ and 44$k$ belonging to the same group are provided with the common solenoid valve 93 and the common check valve 94. In conjunction with a timing of the movement of the ring cam 42, the opening and closing of the common solenoid valve is controlled to perform the motoring operation of the hydraulic pump 20. By sharing the solenoid valve 93 and the check valve 94 with the pistons 44$l$ and 44$k$, the number of the valves (93, 94) can be reduced.

In FIG. 7, only the supply path 92 for the working chambers 45$l$ and 45$k$ is shown. In practice, to other working chambers 45, the supply path 92 for the pressurized oil may be connected. For instance, among all of the working chambers 45$i$ (I=1 to m), the T number of the working chambers 45 may be connected to the supply path 92. When the redundancy is 'n', there are 'j/n' types of the reciprocation motion cycles of the pistons 44 in the 'j' number of the working chambers 45. Specifically, there are 'j/n' sets of the pistons reciprocating in different cycles and thus, a set of the common solenoid valve 93 and the common check valve 94 is provided for each of the 'j/n' sets of the pistons.

The wind turbine generator of the second embodiment and the method of attaching and detaching the blade of the second embodiment is explained below.

First, in a state that the brake by the brake disc 30 and the brake caliper 34 is released, the main shaft 2C (the rotor 2) is rotated to the desired angular position via the ring cam by supplying the pressurized oil from the pump 95 to the working chamber 45 via the supply path 92 for the pressurized oil. Specifically, the pressurized oil is supplied to the hydraulic pump 20 from the pressurized-oil source in the form of the pump 95, the hydraulic pump 20 is driven by the pressurized oil and then the rotor 2 is rotated to the desired angular position.

Further, the angular position of the rotor 2 may be detected by the rotary encoder 29, and based on the detection result, the opening and closing of the solenoid valve 93 and the low-pressure valve 72 is controlled by a valve controller. For instance, based on a difference between the desired angular position of the rotor 2 and the detected angular position detected by the rotary encoder 29, a duration of performing the motoring operation of the hydraulic pump may be adjusted.

Once the rotor 2 is rotated to the desired angular position, in the manner similar to the first embodiment, the braking force is applied to the rotor 2 by the brake disc 30 and the brake caliper 34 to stop the rotor 2 at the desired angular position. Then, the lock pin 61 is inserted in the first hole (the fixing hole) 54 of the brake disc 30 and the second hole 63 of the stationary member 62 to lock the rotor 2 at the desired angular position and the rotor is immobilized in the rotational direction. In the process, it is determined whether or not the first hole 54 coincides with the second hole 63 based on the detected angular position detected by the rotary encoder 29. When it is determined that the first hole 54 coincides with the second hole 63, the lock pin 61 may be automatically inserted in the first hole 54 and the second hole 63.

For the purpose of stopping and locking the rotor 2 at the desired angular position, the operating oil may be sealed in the working chamber 45 into the hydraulically locked state by maintaining the high-pressure valve 70 and the low-pressure valve 72 closed.

Once the rotor 2 is locked at the desired angular position, the blade attaching/detaching operation of the blade 2A with respect to the hub 2B is performed. For instance, when attaching the blade 2A to the hub 2B, with the rotor locked at the desired angular position, the blade root of the blade 2A is attached at the blade fixing hole 2D of the hub 2B to fix the blade 2A to the hub 2B.

In the second embodiment, the pressurized oil is supplied from the pump (the pressurized-oil source) 95 to the hydraulic pump 20 and the hydraulic pump 20 is driven by the pressurized oil. Thus, the rotor 2 can be rotated to the desired angular position using the hydraulic pump 20 of the hydraulic transmission 4 without a hydraulic actuator for rotating the rotor 2.

While the embodiments of the present invention have been described in details, the present invention is not limited to this and it is obvious to those skilled in the art that various changes may be made without departing from the scope of the invention.

For instance, in the above embodiments, the turning operation of the rotor 2 is performed by the hydraulic cylinder or by performing the motoring operation of the hydraulic pump 20. It is also possible to use a dummy blade during the turning operation so that the rotor 2 can be rotated with low toque.

Figure 8:
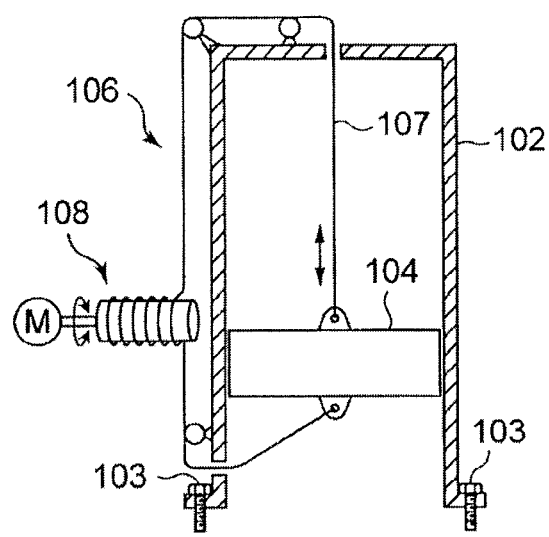
FIG. 8 shows a configuration example of a dummy blade used for the rotor turning operation.
Figure 9:
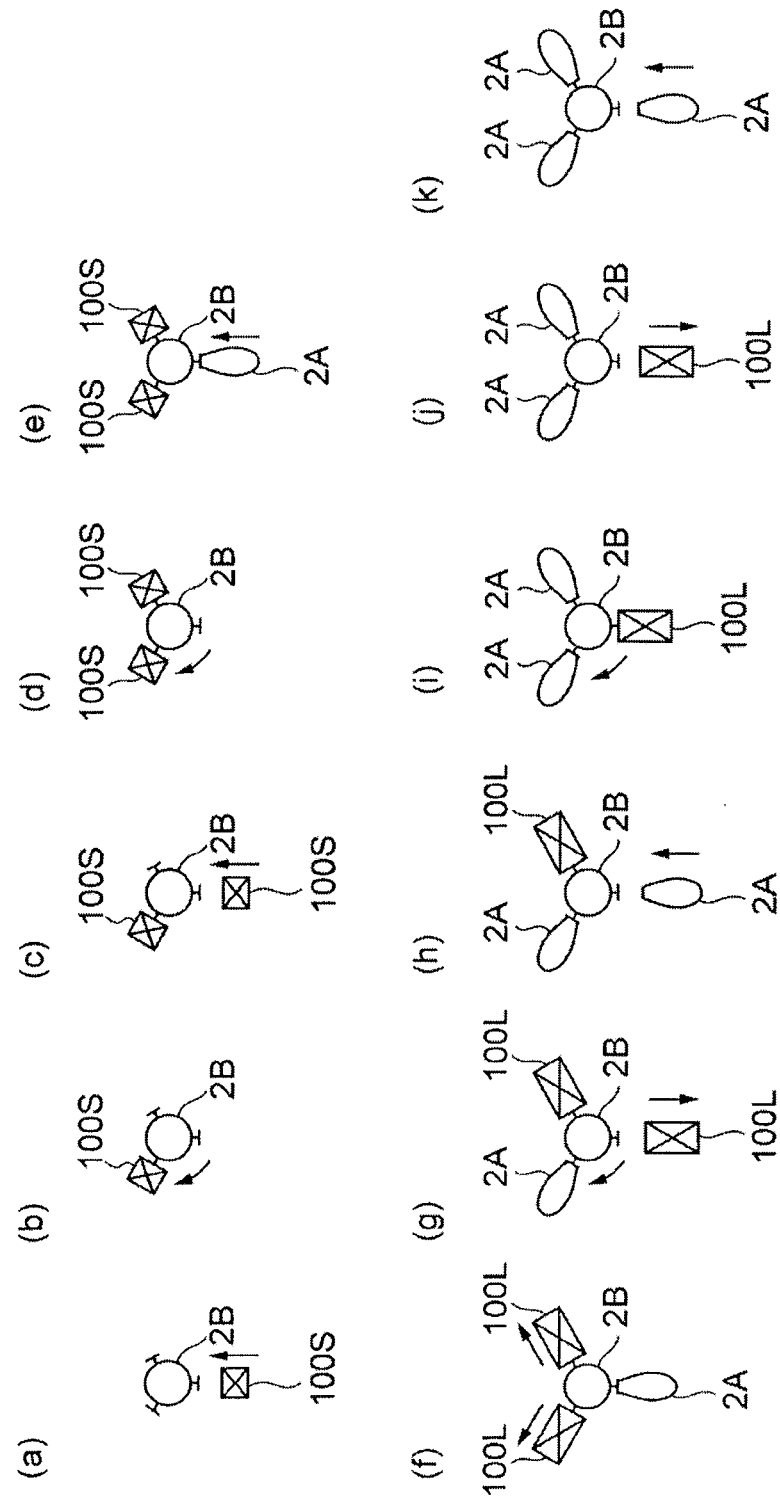
FIG. 9 illustrates a process of attaching blades using the dummy blade.

FIG. 8 shows a configuration example of the dummy blade used for the rotor turning operation. FIG. 9 illustrates a process of attaching blades using the dummy blade. FIG. 10 illustrates a process of detaching the blades using the dummy blade.

As shown in FIG. 8, the dummy blade 100 includes a cylindrical member 102 fixed to the hub 2B, a weight 104 housed in the cylindrical member 102, and a weight position adjusting mechanism 106 which adjusts a position of the weight 104 inside the cylindrical member 102.

The cylindrical member 102 is attached at a root to the blade fixing hole 2D of the hub 2B by a bolt 103. From a perspective of simplifying the operation of attaching and detaching the dummy blade 10, the number of the bolts 103 may be smaller than that of the bolts used to attach the blade 2A at the blade fixing hole 2D. Different from the blade 2A, the dummy blade is not used during the normal operation of the wind turbine generator and thus, the tightening portion of the dummy blade 100 and the hub 2B is not subjected to high centrifugal force caused by the rotation of the rotor 2. Therefore, fewer bolts 103 suffice to fasten the dummy blade 100.

From the perspective of increasing an adjustment margin of a position of the center of gravity of the dummy blade 100 by adjusting the position of the weight 103, the cylindrical member 102 is preferably lighter than the weight 104. For instance, the weight 104 is made of steel and the cylindrical member 102 is made of FRP so that the cylindrical member 102 is lighter than the weight 104.

The weight position adjusting mechanism 106 includes a rope 107 connected to both ends of the weight 104 and a winding device 108 for winding the rope 107. By this, the position of the weight 104 can be adjusted by winding the rope 107 by the winding device 108. Further, a tensioner (not shown) for increasing tension of the rope 107 is provided to prevent slack of the rope 107.

The winding device 108 can be remotely operated. By this, in such a state that the dummy blade 100 is attached to the hub 2B, the operator can adjust the position of gravity of the dummy blade 100 by remotely operating the winding device from a remote place such as on the ground or in the nacelle.

The process of attaching the blades 2A to the hub 2B using the dummy blades 100 is explained in reference to FIG. 9(*a*) to FIG. 9(*k*). In FIG. 9, a dummy blade 100S indicates the dummy blade in such a state that the weight 104 is positioned closest to the hub 2B by the weight position adjusting mechanism 106. On the other hand, a dummy blade 100L indicates the dummy blade in such a state that the weight 104 is positioned far from the hub 2B by the weight position adjusting mechanism 106.

First, a dummy blade 100S is attached at one of the fixing holes 2D of the hub 2B (see FIG. 9(*a*)). By the hydraulic cylinder 50 or the motoring operation of the hydraulic pump 20, the rotor 2 is rotated by 120 degrees and locked by the locking mechanism 60 (see FIG. 9(*b*)). Then, another dummy blade 100S is attached at another of the blade fixing holes 2D of the hub 2B (see FIG. 9(*c*)) and by the hydraulic cylinder 50 or the motoring operation of the hydraulic pump 20, the rotor 2 is rotated by 120 degrees and locked by the locking mechanism 60 (see FIG. 9(*d*)). Next, the blade 2A is attached at the last one of the fixing holes 2D of the hub 2B (see FIG. 9(*e*)).

Subsequently, the weight 104 is moved far from the hub 2B by the weight position adjusting mechanism 106 to reduce moment around the center axis of the rotor 2 (see FIG. 9(*f*)). In the process, the weight 104 is preferably moved to a position where the moment around the center axis of the rotor 2 is approximately zero.

In this manner, by adjusting the position of the weight 104 by the weight position adjusting mechanism 106 to reduce the moment around the center axis of the rotor 2, the turning operation of the rotor 2 can be performed easily in a next step (see FIG. 9(*g*)).

Next, by the hydraulic cylinder 50 or the motoring operation of the hydraulic pump 20, the rotor 2 is rotated by 120 degrees and locked by the locking mechanism 60, and one of the dummy blades 100L is detached from the hub 2B (see FIG. 9(*g*)). Then, another blade 2A is attached to the hub 2B (see FIG. 9(*h*)).

Subsequently, by the hydraulic cylinder 50 or the motoring operation of the hydraulic pump 20, by the hydraulic cylinder 50 or the motoring operation of the hydraulic pump 20 (see FIG. 9(*i*)), the dummy blade 100L is detached from the hub 2B (see FIG. 9(*j*)) and the blade 2A is attached to the hub 2B (see FIG. 9(*k*)).

In this manner, by suppressing the imbalance of the weight of the rotor 2 (the moment around the center axis of the rotor 2) during the attaching of the blade 2A to the hub 2B using the dummy blades 100L, the rotor 2 can be rotated to the desired angular position with low torque. Specifically, the turning operation of the rotor shown in FIG. 9(*g*) to FIG. 9(*i*) can be performed easily.

Further, the process of detaching the blades 2A from the hub 2B using the dummy blades 100 is explained in reference to FIG. 10(*a*) to FIG. 10(*j*).

First, one of the blades 2A is detached from one of the fixing holes 2D of the hub 2B (see FIG. 10(*a*)) and instead, the dummy blade 100L is attached at the one of the fixing holes 2D of the hub 2B (see FIG. 10(*b*)). The position of the weight 104 is adjusted beforehand by the weight position adjusting mechanism 106 such as to reduce the moment around the center axis of the rotor 2. Thus, the turning operation of the rotor 2 can be performed easily in a next step (see FIG. 10(*c*)).

After attaching the dummy blade 100L to the hub 2B, by the hydraulic cylinder 50 or the motoring operation of the hydraulic pump 20, the rotor 2 is rotated by 120 degrees and locked by the locking mechanism 60 and another one of the blades 2A is detached from the hub 2B (see FIG. 10(*c*)). Then, the dummy blade 100L is attached to the hub 2B (see FIG. 10(*d*)), and by the hydraulic cylinder 50 or the motoring operation of the hydraulic pump 20, the rotor 2 is rotated by 120 degrees and locked by the locking mechanism 60 and the last blade 2A is detached from the hub 2B (see FIG. 10(*e*)).

Subsequently, the weight 104 is moved closer to the hub 2B by the weight position adjusting mechanism 106 (see FIG. 10(*f*)) and the position of gravity of the dummy blade is moved toward the hub 2B (see FIG. 10(*g*)). Then, by the hydraulic cylinder 50 or the motoring operation of the hydraulic pump 20, the rotor 2 is rotated by 120 degrees and locked by the locking mechanism 60, and the dummy blade 100S is detached from the hub 2B (see FIG. 10(*h*)). Finally, by the hydraulic cylinder 50 or the motoring operation of the hydraulic pump 20, the rotor 2 is rotated by 120 degrees and locked by the locking mechanism 60 (see FIG. 10(*i*)), and the last dummy blade 100S is detached from the hub 2B (see FIG. 10(*j*)).

FIG. 9 and FIG. 10 show the examples where the position of the weight 104 is adjusted by the weight position adjusting mechanism 106. However, this is not limitative and even when using the dummy blade 100 without the weight position adjusting mechanism 106, it is possible to achieve the effect of reducing the moment around the center axis of the rotor 2 to some extent.

In FIG. 9 and FIG. 10, "the desired angular position" appropriate for attaching or detaching each of the blades 2A is described as the angular position of the rotor 2 where the blade fixing hole 2D on which the blade attaching/detaching is performed, is placed on the downside in the vertical direction. Specifically, in the above examples, the attaching and detaching of the blade 2A is performed when the blade fixing hole 2D where the blade attaching/detaching is performed faces downward in the vertical direction.

However, "the desired angular position" appropriate for attaching or detaching each of the blades 2A is not limited to the above example and "the desired angular position" appropriate for attaching or detaching each of the blades 2A may be an angular position of the rotor 2 where the blade fixing hole 2D where the blade attaching/detaching is performed is positioned horizontally. In such case, the attaching and detaching of the blade 2A is performed when the blade fixing hole 2D where the blade attaching/detaching is performed faces in the horizontal direction.

REFERENCE NUMERALS

1 WIND TURBINE GENERATOR
2 ROTOR
2A BLADE
2B HUB
2C MAIN SHAFT
2D BLADE FIXING HOLE
3 MAIN SHAFT BEARING
4 HYDRAULIC TRANSMISSION
6 GENERATOR
7 TOWER
8 NACELLE
10 FRONT PART
11 FLANGE
12 REAR PART
13 STEPPED PORTION
14 BOLT
16 BEARING HOUSING
17 CONNECTION FRAME
20 HYDRAULIC PUMP
22 HYDRAULIC MOTOR
24 HIGH-PRESSURE OIL LINE
26 LOW-PRESSURE OIL LINE
29 ROTARY ENCODER
30 BRAKE DISC
31 TIGHTENING PORTION
32 MIDDLE PORTION
33 DISC PORTION
34A OUTER CALIPER
34B INNER CALIPER
35 BRAKE PAD
36 SUPPORT MEMBER
40 CYLINDRICAL MEMBER
42 RING CAM
44 PISTON
45 WORKING CHAMBER
46 CASING
48 PUMP BEARING
50 HYDRAULIC CYLINDER
51 CONNECTION PART
52 BRACKET
53 PART
54 FIXING HOLE (FIRST HOLE)
60 LOCKING MECHANISM
61 LOCK PIN
62 STATIONARY MEMBER
63 SECOND HOLE
64 CORNER
65 CORNER
70 HIGH PRESSURE VALVE
72 LOW PRESSURE VALVE
73 OIL FILTER
74 OIL COOLER
76 BYPASS PASSAGE
78 RELIEF VALVE
80 OIL TANK
82 REPLENISHING LINE
84 PUMP
86 OIL FILTER
88 RETURN LINE
89 RELIEF VALVE
92 SUPPLY PATH
93 SOLENOID VALVE
94 CHECK VALVE
100 PUMP (PRESSURIZED-OIL SOURCE)
100 DUMMY BLADE

102 CYLINDRICAL MEMBER
103 BOLT
104 WEIGHT
106 WEIGHT POSITION ADJUSTING MECHANISM
107 ROPE
108 WINDING DEVICE

The invention claimed is:

1. A power generating apparatus of renewable energy type, comprising:
   a rotor which comprises a hub and a main shaft, the hub having at least one blade mounted thereon, the main shaft being coupled to the hub and being configured to be rotatable together with the hub;
   a fastening bolt for fastening the main shaft with the hub;
   a generator which is configured to generate power by torque inputted from the rotor;
   a hydraulic transmission which is configured to transmit the torque from the rotor to the generator;
   a brake disc which is fixed to the rotor by the fastening bolt so that the brake disk is fastened to the hub and the main shaft; and
   a brake caliper which is disposed around the main shaft and which is configured to force a brake pad against the brake disc to apply a braking force to the rotor,
   wherein the main shaft includes an outward flange which is fastened to the hub with the brake disc, the outward flange being disposed on one end of the main shaft,
      wherein the main shaft extends axially opposite to the hub from a first position where the outward flange on the one end of the main shaft is fastened to both of the brake disc and the hub, toward the other end of the main shaft,
      wherein the brake disc is disposed around the main shaft to spread outward in a radial direction of the main shaft and extend axially opposite to the hub, from the first position to a second position where the brake caliper is provided around the main shaft, the second position being located between an axial position of the one end of the main shaft and an axial position of the other end of the main shaft, and
      wherein the main shaft includes an outer surface whose region between the first position and the second position in an axial direction of the main shaft is covered by the brake disc.

2. The power generating apparatus of renewable energy type according to claim 1, wherein the brake caliper comprises a plurality of outer calipers which are arranged on an outer circumferential side of the brake disc and a plurality of inner calipers which are arranged on an inner circumferential side of the brake disc.

3. The power generating apparatus of renewable energy type according to claim 2, further comprising:
   a tower; and
   a nacelle which is supported by the tower and which houses at least the main shaft,
   wherein the nacelle comprises a nacelle baseplate which is rotatably mounted on the tower, and a nacelle cover which covers the nacelle baseplate, and
   wherein at least one of the brake caliper is fixed to an end of the nacelle baseplate which is on a side closer to the hub.

4. The power generating apparatus of renewable energy type according to claim 1, further comprising:
   a nacelle which houses at least the main shaft; and
   a hydraulic cylinder which has one end fixed to the nacelle side and other end fixed to the brake disc,
   wherein the rotor is rotated with the brake disc by changing a stroke of the hydraulic cylinder.

5. The power generating apparatus of renewable energy type according to claim 4,
   wherein the nacelle comprises a nacelle baseplate which is rotatably mounted on the tower, and a nacelle cover which covers the nacelle baseplate,
   wherein a pair of the hydraulic cylinders are arranged on both sides of the brake disc respectively, and
   where each of the pair of the hydraulic cylinders is arranged upright on the nacelle baseplate and fixed to the brake disc via a bracket.

6. The power generating apparatus of renewable energy type according to claim 1, further comprising:
   a locking mechanism which locks the rotor at a desired angular position,
   wherein the brake disc is formed with a plurality of first holes in a circumferential direction, and
   wherein the locking mechanism is a lock pin which is inserted in one of the first holes and a second hole formed on the nacelle side.

7. The power generating apparatus of renewable energy type according to claim 1,
   wherein the power generating apparatus of renewable energy type is a wind turbine generator which rotates the rotor by renewable energy in form of wind and inputs the torque from the rotor to the generator via the hydraulic transmission.

8. A power generating apparatus of renewable energy type, comprising:
   a rotor which comprises a hub and a main shaft, the hub having at least one blade mounted thereon, the main shaft being coupled to the hub;
   a fastening bolt for fastening the main shaft with the hub;
   a generator which is configured to generate power by torque inputted from the rotor;
   a hydraulic transmission which is configured to transmit the torque from the rotor to the generator;
      a brake disc which is fixed to the rotor by the fastening bolt so that the brake disk is fastened to the hub and the main shaft; and
   a brake caliper which forces a brake pad against the brake disc to apply a braking force to the rotor;
   a nacelle which houses at least the main shaft;
   a main shaft bearing which supports the main shaft rotatably on a nacelle side; and
   a bearing housing which houses the main shaft bearing,
   wherein the brake disc extends in an axial direction of the main shaft toward the bearing housing from a position where the brake disc is fastened to the hub and the main shaft, and
   wherein at least one of the brake caliper is mounted on the bearing housing.

9. The power generating apparatus of renewable energy type according to claim 8,
   wherein the main shaft includes a flange which is fastened to the hub with the brake disc, and
   wherein the brake disc spreads outward in a radial direction of the main shaft from a position where the brake disc is fastened to the flange and the hub.

10. A method of attaching and detaching a blade for a power generating apparatus of renewable energy type which comprises:
   a rotor which includes a hub having at least one blade mounted thereon and a main shaft coupled to the hub and being configured to be rotatable together with the hub;
   a fastening bolt for fastening the main shaft with the hub;

a generator which is configured to generate power by torque inputted from the rotor;

a hydraulic transmission which is configured to transmit the torque from the rotor to the generator;

a brake disc which is fixed to the rotor by the fastening bolt so that the brake disk is fastened to with the hub and the main shaft; and a brake caliper which is disposed around the main shaft and which is configured to force a brake pad against the brake disc to apply a braking force to the rotor, wherein the main shaft includes an outward flange which is fastened to the hub with the brake disc, the outward flange being disposed on one end of the main shaft, wherein the main shaft extends axially opposite to the hub from a first position where the outward flange on the one end of the main shaft is fastened to both of the brake disc and the hub, toward the other end of the main shaft, wherein the brake disc is disposed around the main shaft to spread outward in a radial direction of the main shaft and extend axially opposite to the hub, from the first position to a second position where the brake caliper is provided around the main shaft, the second position being located between an axial position of the one end of the main shaft and an axial position of the other end of the main shaft, and wherein the main shaft includes an outer surface whose region between the first position and the second position in an axial direction of the main shaft is covered by the brake disc, the method comprising the steps of:

rotating the rotor to a desired angular position by a hydraulic actuator;

stopping the rotor at the desired angular position by the brake disc and the brake caliper;

locking the rotor at the desired angular position; and attaching or detaching the blade with respect to the hub in such a state that the rotor is locked.

11. The method of attaching and detaching the blade for the power generating apparatus of renewable energy type according to claim 10, wherein the power generating apparatus of renewable energy type further comprises a nacelle which houses at least the main shaft, wherein the hydraulic actuator is a hydraulic cylinder having one end fixed to the nacelle side and other end fixed to the brake disc, and wherein, in the step of rotating the rotor, the rotor is rotated to the desired angular position by rotating the brake disc using the hydraulic cylinder.

12. The method of attaching and detaching the blade for the power generating apparatus of renewable energy type according to claim 11, wherein, in the step of rotating the rotor, the rotor is intermittently rotated by repeating: changing a stroke of the hydraulic cylinder while attaching the other end of the cylinder to the brake disc; and then returning the stroke of the hydraulic cylinder to an original stroke while disconnecting the other end of the hydraulic cylinder from the brake disc.

13. The method of attaching and detaching the blade for the power generating apparatus of renewable energy type according to claim 11, wherein, in the step of locking the rotor, the rotor is locked by fixing a stroke of the hydraulic cylinder.

14. The method of attaching and detaching the blade for the power generating apparatus of renewable energy type according to claim 10, wherein the power generating apparatus of renewable energy type further comprises a nacelle which houses at least the main shaft, wherein the brake disc is formed with a plurality of first holes in a circumferential direction, and wherein, in the step of locking the rotor, the rotor is locked by inserting a lock pin in one of the first holes and a second hole formed on the nacelle side.

15. The method of attaching and detaching the blade for the power generating apparatus of renewable energy type according to claim 14, wherein the desired angular position is defined for each of the blades, and wherein the second hole formed on the nacelle side coincides with one of the first holes formed in the brake disc when the rotor is stopped at the desired angular position defined for each of the blades.

16. The method of attaching and detaching the blade for the power generating apparatus of renewable energy type according to claim 10, wherein the hydraulic transmission includes a hydraulic pump and a hydraulic motor, the hydraulic pump being driven with rotation of the main shaft to generate pressurized oil, the hydraulic motor driving the generator by the pressurized oil supplied from the hydraulic pump, and wherein, in the step of rotating the rotor, the rotor is rotated to the desired angular position by driving the hydraulic pump as the hydraulic actuator with pressurized oil supplied from a pressurized-oil source.

17. The method of attaching and detaching the blade for the power generating apparatus of renewable energy type according to claim 10, further comprising the step of:

before the step of rotating the rotor, attaching a dummy blade to the hub, wherein, in the step of rotating the rotor, the rotor is rotated in such a state that the dummy blade is attached to the hub.

18. The method of attaching and detaching the blade for the power generating apparatus of renewable energy type according to claim 17, wherein the dummy blade comprises a tubular member which is fixed to the hub and a movable weight which is supported inside the tubular member, and wherein the method further comprises the step of:

before the step of attaching the dummy blade, adjusting a position of the movable weight to reduce a moment around a center axis of the rotor.

19. A power generating apparatus of renewable energy type, comprising:

a rotor which comprises a hub and a main shaft, the hub having at least one blade mounted thereon, the main shaft being coupled to the hub and being configured to be rotatable together with the hub;

a fastening bolt for fastening the main shaft with the hub;

a generator which is configured to generate power by torque inputted from the rotor;

a brake disc which is fixed to the rotor by the fastening bolt so that the brake disc is fastened to the hub and the main shaft; and a brake caliper which is disposed around the main shaft and which is configured to force a brake pad against the brake disc to apply a braking force to the rotor, wherein the main shaft includes an outward flange which is fastened to the hub with the brake disc, the outward flange being disposed on one end of the main shaft, wherein the main shaft extends axially opposite to the hub from a first position where the outward flange on the one end of the main shaft is fastened to both of the brake disc and the hub, toward the other end of the main shaft, wherein the brake disc is disposed around the main shaft to spread outward in a radial direction of the main shaft and extend axially opposite to the hub, from the first position to a second position where the brake caliper is provided around the main shaft, the second position being located between an axial position of the one end of the main shaft and an axial position of the other end of the main shaft, and wherein the main shaft includes an outer surface whose region between the first position and the second position in an axial direction of the main shaft is covered by the brake disc.

20. A power generating apparatus of renewable energy type, comprising:

a rotor which comprises a hub and a main shaft, the hub having at least one blade mounted thereon, the main shaft being coupled to the hub;

a fastening bolt for fastening the main shaft with the hub;

a generator which is configured to generate power by torque inputted from the rotor;

a brake disc which is fixed to the rotor by the fastening bolt so that the brake disc is fastened to the hub and the main shaft; and a brake caliper which forces a brake pad against the brake disc to apply a braking force to the rotor;

a nacelle which houses at least the main shaft;

a main shaft bearing which supports the main shaft rotatably on a nacelle side; and a bearing housing which houses the main shaft bearing, wherein the brake disc extends in an axial direction of the main shaft toward the bearing housing from a position where the brake disc is fastened to the hub and the main shaft, and wherein at least one of the brake caliper is mounted on the bearing housing.

* * * * *